US010762229B2

(12) United States Patent
Sion et al.

(10) Patent No.: US 10,762,229 B2
(45) Date of Patent: Sep. 1, 2020

(54) SECURE SEARCHABLE AND SHAREABLE REMOTE STORAGE SYSTEM AND METHOD

(71) Applicant: PRIVATE MACHINES INC., Brooklyn, NY (US)

(72) Inventors: Radu Sion, Brooklyn, NY (US); Sumeet Vijay Bajaj, New York, NY (US); Jan Wojciech Kasiak, Seaford, NY (US)

(73) Assignee: Private Machines Inc., Brooklyn, NY (US)

( * ) Notice: Subject to any disclaimer, the term of this patent is extended or adjusted under 35 U.S.C. 154(b) by 269 days.

(21) Appl. No.: 15/742,497

(22) PCT Filed: May 6, 2016

(86) PCT No.: PCT/US2016/031156
§ 371 (c)(1),
(2) Date: Jan. 5, 2018

(87) PCT Pub. No.: WO2017/023385
PCT Pub. Date: Feb. 9, 2017

(65) Prior Publication Data
US 2019/0087432 A1 Mar. 21, 2019

Related U.S. Application Data

(60) Provisional application No. 62/189,650, filed on Jul. 7, 2015.

(51) Int. Cl.
*G06F 17/00* (2019.01)
*G06F 21/62* (2013.01)
(Continued)

(52) U.S. Cl.
CPC .......... *G06F 21/6227* (2013.01); *G06F 16/13* (2019.01); *G06F 16/178* (2019.01);
(Continued)

(58) Field of Classification Search
CPC .. G06F 16/178; G06F 16/1844; G06F 16/958; G06F 16/182; G06F 16/10; G06F 16/1794
See application file for complete search history.

(56) References Cited

U.S. PATENT DOCUMENTS

2005/0091487 A1 4/2005 Cross et al.
2009/0300351 A1 12/2009 Lei et al.
(Continued)

OTHER PUBLICATIONS

Agrawal et al., Order Preserving Encryption for Numeric Data, In Proceedings of the 2004 ACM SIGMOD international conference on Management of data, pp. 563-574, ACM, 2004.
(Continued)

*Primary Examiner* — Truong V Vo
(74) *Attorney, Agent, or Firm* — The Law Office of Daniel T. Weglarz, P.C.

(57) ABSTRACT

A secure searchable and shareable remote storage system and method which utilizes client side processing to enable search capability of the stored data, allow the synchronizing of stored data between multiple discrete devices, and allow sharing of stored data between multiple discrete users. Such a remote storage system and method includes a networked remote computer server which receives and stores encrypted data and manages access thereto and a client device configured to index data to be stored, upload secured data and related information, perform searches on the stored data and related information locally, and implement cryptographic protocols which allow the stored data and related information to be synchronized with other desired client devices. Advantageously, since trusted client-side search code may
(Continued)

directly access mostly plaintext data, it may operate orders of magnitude faster than the equivalent server code which may access encrypted data only.

42 Claims, 4 Drawing Sheets

(51) Int. Cl.
| | |
|---|---|
| *H04L 9/08* | (2006.01) |
| *H04L 29/06* | (2006.01) |
| *G06F 16/21* | (2019.01) |
| *G06F 16/22* | (2019.01) |
| *G06F 16/903* | (2019.01) |
| *G06F 16/178* | (2019.01) |
| *G06F 16/13* | (2019.01) |
| *H04L 29/08* | (2006.01) |

(52) U.S. Cl.
CPC .......... *G06F 16/21* (2019.01); *G06F 16/2246* (2019.01); *G06F 16/2272* (2019.01); *G06F 16/903* (2019.01); *G06F 21/62* (2013.01); *G06F 21/6218* (2013.01); *H04L 9/0861* (2013.01); *H04L 9/0891* (2013.01); *H04L 63/0428* (2013.01); *H04L 63/10* (2013.01); *H04L 67/1097* (2013.01)

(56) References Cited

U.S. PATENT DOCUMENTS

| | | | |
|---|---|---|---|
| 2010/0027795 | A1 | 2/2010 | Wajs et al. |
| 2011/0289322 | A1* | 11/2011 | Rasti .................. H04L 63/0421 713/182 |
| 2014/0108796 | A1 | 4/2014 | Johnson et al. |
| 2014/0122866 | A1 | 5/2014 | Haeger et al. |
| 2014/0129830 | A1 | 5/2014 | Raudaschl |
| 2015/0121549 | A1 | 4/2015 | Baessler et al. |
| 2015/0156011 | A1 | 6/2015 | Kamara et al. |

OTHER PUBLICATIONS

Ateniese et al., Proofs of Storage from Homomorphic Identification Protocols, Advances in Cryptology—ASIACRYPT 2009. Lecture Notes in Computer Science, vol. 5912, Springer, 2009.
Baek et al.,On the Integration of Public Key Data Encryption and Public Key Encryption with Keyword Search, Proceedings of the 9th international conference on Information Security, vol. 4176 of Lecture Notes in Computer Science, pp. 217-232, Springer, 2006.
Baek et al., Public Key Encryption with Keyword Search Revisited, Proceedings of the international conference on Computational Science and Its Applications, Part I, vol. 5072 of Lecture Notes in Computer Science, pp. 1249-1259, Springer, 2008.
Bao et al., Private Query on Encrypted Data in Multi-user Settings, Proceedings of the 4th international conference on Information security practice and experience, vol. 4991 of Lecture Notes in Computer Science, pp. 71-85, Springer, 2008.
Bellare et al., Deterministic and Efficiently Searchable Encryption, Advances in cryptology—CRYPTO 2007, vol. 4622 of Lecture Notes in Computer Science, pp. 535-552, Springer, 2007.
Boldyreva et al., Order-Preserving Symmetric Encryption, Advances in Cryptology—EUROCRYPT 2009, vol. 5479 of Lecture Notes in Computer Science, pp. 224-241, Springer, 2009.
Boneh et al., Public Key Encryption with Keyword Search, Advances in Cryptology—EUROCRYPT 2004, vol. 3027 of Lecture Notes in Computer Science, pp. 506-522, Springer, 2004.
Boneh et al., Public Key Encryption that Allows PIR Queries, Advances in Cryptology—CRYPTO 2007, vol. 4622 of Lecture Notes in Computer Science, pp. 50-67, Springer, 2007.

Boneh et al., Functional Encryption: Definitions and Challenges, Proceedings of the 8th conference on Theory of cryptography, vol. 6597 of Lecture Notes in Computer Science, pp. 253-273, Springer, 2011.
Boneh et al., Conjunctive, Subset, and Range Queries on Encrypted Data, Proceedings of the 4th conference on Theory of cryptography, vol. 4392 of Lecture Notes in Computer Science, pp. 535-554, Springer, 2007.
Bösch et al., Selective Document Retrieval from Encrypted Database, Information Security Conference—15th Information Security Conference (ISC 2012), vol. 7483 of Lecture Notes in Computer Science, pp. 224-241, Springer, 2012.
Bowers et al., Proofs of Retrievability: Theory and Implementation, In Proceedings of the 2009 ACM workshop on Cloud computing security, pp. 43-54, 2009.
Byun et al., Off-Line Keyword Guessing Attacks on Recent Keyword Search Schemes over Encrypted Data, Secure Data Management, Third VLDB Workshop, vol. 4165 of Lecture Notes in Computer Science, pp. 75-83, Springer, 2006.
Chai et al., Verifiable Symmetric Searchable Encryption for Semi-honest-but-curious Cloud Servers, Technical Report CACR 2011-22, University of Waterloo, 2011.
Chang et al., Privacy Preserving Keyword Searches on Remote Encrypted Data, Proceedings of the Third international conference on Applied Cryptography and Network Security, vol. 3531 of Lecture Notes in Computer Science, pp. 442-455, Springer, 2005.
Chase et al., Structured Encryption and Controlled Disclosure, Advances in Cryptology—ASIACRYPT 2010, Lecture Notes in Computer Science, vol. 6477, pp. 577-594, Springer, 2010.
Curtmola et al., Searchable Symmetric Encryption: Improved Definitions and Efficient Constructions, In Proceedings of the 13th ACM conference on Computer and Communications Security, pp. 79-88, ACM, 2006.
Fuhr et al., Decryptable Searchable Encryption, Provable Security, First International Conference, ProvSec 2007, Lecture Notes in Computer Science, vol. 4784, pp. 228-236, Springer, 2007.
Goh et al., Secure Indexes. Technical Report 216, IACR, 2003.
Ostrovsky et al., Software Protection and Simulation on Oblivious RAMs, Journal of ACM, 43(3):431-473, 1996.
Golle et al., Secure Conjunctive Keyword Search Over Encrypted Data, Applied Cryptography and Network Security, Second International Conference, Lecture Notes in Computer Science, vol. 3089, pp. 31-45, Springer, 2004.
Hofheinz et al., Searchable encryption with decryption in the standard model, Cryptology ePrint Archive, 2008.
Hore et al., Secure multidimensional range queries over outsourced data, The VLDB Journal, 21(3):333-358, 2012.
Ali, et al., Public Key Encryption with Conjunctive Field Free Keyword Search Scheme, International Journal of Computers and Technology, 2016-12-18, vol. 15 No. 14.
Ibraimi et al., Public-Key Encryption with Delegated Search, Applied Cryptography and Network Security—9th International Conference, Lecture Notes in Computer Science, vol. 6715, Springer, 2011.
Iovino et al., Hidden-Vector Encryption with Groups of Prime Order, Pairing-Based Cryptography—Pairing 2008, Lecture Notes in Computer Science, vol. 5209, pp. 75-88 Springer, 2008.
Islam et al., Access Pattern disclosure on Searchable Encryption: Ramification, Attack and Mitigation, In Proceedings of the Network and Distributed System Security Symposium, NDSS 2012, Internet Society, 2012.
Katz et al., Predicate Encryption Supporting Disjunctions, Polynomial Equations, and Inner Products, Advances in cryptology—EUROCRYPT 2008, vol. 4965 of Lecture Notes in Computer Science, pp. 146-162, Springer, 2008.
Kerschbaum et al., Searchable Encryption for Outsourced Data Analytics, Public Key Infrastructures, Services and Applications, 7th EuropeanWorkshop, Lecture Notes in Computer Science, vol. 6711, pp. 61-76, Springer, 2011.
Kuzu et al., Efficient Similarity Search over Encrypted Data, Proceedings of the 2012 IEEE 28th International Conference on Data Engineering, Apr. 1, 2012, pp. 1156-1167, IEEE Computer Society Washington, DC.

(56) References Cited

OTHER PUBLICATIONS

Pappas et al., Private Search in the Real World, Proceedings of the 27th Annual Computer Security Applications Conference, pp. 83-92, Dec. 5, 2011, AMC New York.

Raykova et al., Usable Secure Private Search, IEEE Security and Privacy, Sep. 1, 2012, IEEE Educational Activities Department Piscataway, New Jersey.

Shacham et al., Compact Proofs of Retrievability, Advances in Cryptology—ASIACRYPT 2008. Lecture Notes in Computer Science, vol. 5350, pp. 90-10, Springer, 2008.

Shen et al., Predicate Privacy in Encryption Systems, Proceedings of the 6th Theory of Cryptography Conference on Theory of Cryptography, Lecture Notes in Computer Science, vol. 5444, pp. 457-47, Springer, 2009.

Song et al., Practical Techniques for Searches on Encrypted Data, Proceedings of the 2000 IEEE Symposium on Security and Privacy, pp. 44-55, IEEE Computer Society Washington, DC, May 14, 2000.

Tang, Privacy Preserving Mapping Schemes Supporting Comparison, Proceedings of the 2010 ACM workshop on Cloud computing security workshop, pp. 53-58, ACM New York, Oct. 8, 2010.

Tang, Towards Public Key Encryption Scheme Supporting Equality Test with Fine-Grained Authorization, Information Security and Privacy, Proceedings of the 16th Australasian Conference on Information Security and Privacy, Lecture Notes in Computer Science, vol. 6812, pp. 389-406, Springer, 2011.

Tang, Public key encryption schemes supporting equality test with authorisation of different granularity, International Journal of Applied Cryptography, Jul. 1, 2012, Inderscience Publishers Inderscience Publishers, Geneva, Switzerland, vol. 2 Issue 4.

Tang, Public key encryption supporting plaintext equality test and user-specified authorization, Feb. 2, 2012, Security and Communication Network.

Zhang et al., Generic Combination of Public Key Encryption with Keyword Search and Public Key Encryption, Proceedings of the 6th international conference on Cryptology and network security, Lecture Notes in Computer Science, vol. 4856, pp. 159-174, Springer, 2007.

* cited by examiner

SECURE SEARCHABLE AND SHAREABLE REMOTE STORAGE SYSTEM AND METHOD

CROSS REFERENCE TO RELATED APPLICATIONS

This application claims the benefit of and incorporates by reference U.S. provisional patent application Ser. No. 62/189,650 filed in the United States on Jul. 7, 2015.

STATEMENT REGARDING FEDERALLY-SPONSORED RESEARCH OR DEVELOPMENT

This invention was made with government support under award number IIP-1329509 awarded by the National Science Foundation. The government has certain rights in the invention.

BACKGROUND OF THE INVENTION

Field of the Invention

The present invention generally relates to outsourced storage technologies and, more particularly, to a remote data storage system which enables secured data to be stored, searched, and selective distributed through a cloud.

Description of the Existing Art

Cloud Storage Generally

The exponential growth and advances in cheap, high-speed communication allow for unprecedented levels of global information exchange and interaction. As a result, new market forces emerge that propel toward a fundamental, cost-efficient paradigm shift in the way computing and storage is deployed and delivered: outsourced computing and outsourced storage.

Outsourcing may minimize users' overheads and benefit from a service provider's global expertise consolidation and bulk pricing. Accordingly, it may be deployed to efficiently provide computing in a scalable, on-demand, and virtualized manner through the Internet. Many established companies, such as Google, Amazon, and Microsoft, are rushing to offer increasingly complex storage and computation services. These services and their globally distributed support infrastructures are commonly referred to as "cloud" computing or storage.

Cloud computing employs dynamically virtualized and scalable resources which are provided as a service over the Internet. Its users need not have knowledge of, expertise in, or ownership of the technology infrastructure in the "cloud" that supports them. Cloud services are provided at each layer in the technology stack, including: infrastructure as a service (IaaS), platform as a service (PaaS), and at the application layer (software as a service—SaaS, business process as a service—BPaaS, and knowledge as a service—KaaS, among others). Applications "in the cloud" are typically accessed online through a web browser. The software, data model and associated business knowledge are hosted by the cloud.

Cloud (namely, "outsourced") storage is a model of data storage wherein the digital data is stored in logical pools, with the physical storage spanning multiple servers (and often locations) and the physical environment typically owned and managed by a hosting company ("provider").

These cloud storage providers are responsible for keeping the data available and accessible and the physical environment protected and running. People and organizations typically buy or lease storage capacity from the providers to store user, organization, or application data.

Cloud storage services may be accessed through a co-located cloud computer service, a web service application programming interface ("API") or by applications that utilize the API, such as cloud desktop storage, a cloud storage gateway or Web-based content management systems.

Cloud storage is based on highly virtualized infrastructure and is like broader cloud computing in terms of accessible interfaces, near-instant elasticity and scalability, multi-tenancy, and metered resources. Cloud storage services can be utilized from an off-premises service (such as Amazon S3) or deployed on-premises (e.g., ViON Capacity Services).

Examples of cloud storage include: object storage services like Amazon S3 and Microsoft Azure Storage, object storage software like Openstack Swift, object storage systems like EMC Atmos and Hitachi Content Platform, and distributed storage research projects like OceanStore and VISION Cloud.

Examples of the services which may be provided through cloud storage include:

Remote Backup Service. A remote, online, or managed backup service, sometimes marketed as cloud backup or backup-as-a-service, is a cloud storage service that specializes in the backup, storage, and recovery of computer files. Online backup systems are typically built around a client software program that runs on a schedule, typically once a day, and usually at night while computers aren't in use. This program typically collects, compresses, encrypts, and transfers the data to the remote backup service provider's servers or off-site hardware.

File Hosting Service. A file hosting service is a cloud storage service specifically designed to host files (as opposed to simple "blocks" or "data items"). It allows users to upload files that could then be accessed remotely from a different computer, tablet, smart phone or other networked device, by the same user or possibly by other users. Typically, the services allow HTTP access, and sometimes FTP access. Similar related services are content-displaying hosting services (i.e. video and image), virtual storage, and remote backup.

Personal file storage. Personal file storage services are aimed at private individuals, offering a sort of "network storage" for personal backup, file access, or file distribution. Users can upload their files and share them publicly or keep them password-protected.

Document-sharing services allow users to share and collaborate on document files. These services originally targeted files such as PDFs, word processor documents, and spreadsheets. However many remote file storage services are now aimed at allowing users to share and synchronize all types of files across all the devices they use. Users may create special "synchronized" folders on each of their computers or mobile devices, which the service then synchronizes so that it appears to be the same folder regardless of which computer is used to view it. Files placed in this folder also are typically accessible through a website and mobile apps, and can be easily shared with other users for viewing or collaboration. Such services have become popular via consumer products such as Dropbox and Google Drive.

The advantages of cloud storage are well known and include the following:

Pay-per-use. Companies need only pay for the storage they actually use, typically an average of consumption during a month. This does not mean that cloud storage is less expensive, only that it incurs operating expenses rather than capital expenses.

Off-premises Storage Choice. Organizations can choose between off-premises and on-premises cloud storage options, or a mixture of the two options, depending on relevant decision criteria that is complementary to initial direct cost savings potential; for instance, continuity of operations, disaster recovery, security, and records retention laws, regulations, and policies.

Availability. Storage availability and data protection may be higher than in-house efforts, so, depending on the application, the additional technology, effort and cost to add availability and protection can be eliminated.

Off-site Management. Storage maintenance tasks, such as purchasing additional storage capacity, are offloaded to the responsibility of a service provider.

Additional Applications. Cloud storage provides users with immediate access to a broad range of resources and applications hosted in the infrastructure of another organization often via a web service interface.

Integration with Cloud Computing. Cloud storage can be used for copying virtual machine images from the cloud to on-premises locations or to import a virtual machine image from an on-premises location to the cloud image library. In addition, cloud storage can be used to move virtual machine images between user accounts or between data centers.

Redundancy. Cloud storage can be used as natural disaster proof backup, as many providers usually offer 2 or 3 different copies, often located in different places around the globe.

Flexible pricing. Some online file storage services offer space on a per-gigabyte basis, and sometimes include a bandwidth cost component as well. Usually these will be charged monthly or yearly. Some companies offer the service for free, relying on advertising revenue. Some hosting services do not place any limit on how much space the user's account can consume. Some services require a software download which makes files only available on computers which have that software installed, others allow users to retrieve files through any web browser. With the increased inbox space offered by webmail services, many users have started using their webmail service as an online drive. Some sites offer free unlimited file storage but have a limit on the file size. Some sites offer additional online storage capacity in exchange for new customer referrals.

Nevertheless, significant challenges lie in the path to successful large-scale adoption. Some general challenges include supplier stability and accessibility of data. Notwithstanding such general matters of concern, one of today's major obstacle to cloud adoption is security and privacy. Potential cloud clients and current adopters, in numerous surveys, time and again, name security and privacy the top concerns preventing cloud adoption, including potential clients and current adopters throughout the Asia Pacific, Europe and American markets. Simply put, numerous clients will forgo tremendous benefits in on-demand scalability, quality and cost, and deploy expensive, in-house information technology ("IT") departments rather than risk unauthorized access to their data or business logic.

As such, the emergence of cloud storage services have prompted much discussion on security. Security, as it relates to cloud storage can be broken down into a number of dimensions, including the following:

Overall Attack Surface Area. Outsourcing data storage increases the attack surface area.

Unauthorized Access. When data is distributed it is stored at more locations increasing the risk of unauthorized physical access to the data. For example, when data is replicated and moved frequently, the risk of unauthorized data recovery increases dramatically (e.g. disposal of old equipment, reuse of drives, reallocation of storage space). The manner in which data is replicated depends on the service level a customer chooses and on the service provided. Different cloud vendors offer different service levels.

Further, the number of people with access to the data who could be compromised (i.e. bribed, or coerced) increases dramatically. A single company might have a small team of administrators, network engineers and technicians, but a cloud storage company will have many customers and thousands of servers and therefore a much larger team of technical staff with physical and electronic access to almost all of the data at the entire facility or perhaps the entire company.

Cloud storage increases the number of networks over which the data travels. Instead of just a local area network (LAN) or storage area network (SAN), data stored on a cloud requires a WAN (wide area network) to connect them both. By sharing storage and networks with many other users/customers it is possible for other customers to access your data. Sometimes because of erroneous actions, faulty equipment, a bug and sometimes because of criminal intent. This risk applies to all types of storage and not only cloud storage.

Shift in Liability. Consumer-grade, public file hosting and synchronization services are popular, but for business use, they create the concern that corporate information is exported to devices and cloud services that are not controlled by the organization.

Data Access and Integrity. The following questions must be answered: Will the user be able to continue accessing their data? Who else can access it? Who can change it?

Whether the user is able to continue accessing their data depends on a large number of factors, ranging from the location and quality of their internet connection and the physical integrity of the provider's data center to the financial stability of the storage provider.

The question of who can access and, potentially, change their data ranges from what physical access controls are in place in the provider's data center to what technical steps have been taken, such as access control, encryption, etc.

Data Confidentiality. Risk of unauthorized access to data can be mitigated through the use of encryption, which can be applied to data as part of the storage service or by on-premises equipment that encrypts data prior to uploading it to the cloud.

The risk of having data read during transmission can be mitigated through network-centric encryption technology. Encryption in transit protects data as it is being transmitted to and from the cloud service whereas encryption at rest protects data that is stored at the service provider.

While encryption is generally regarded as best practice in cloud storage, how the encryption is implemented is very important.

For example, encryption with secret keys that are kept by the service user, as opposed to the service provider limit the access to data by service provider employees. In this setup, the hosting service should not be able to see user data even with physical access to the servers.

Deduplication. One downside of encryption with different keys is the fact that it results in unique different encrypted representations of the same file, which makes data deduplication impossible and therefore causes the provider to use more storage space overall and thus charge more.

To alleviate this problem, a weaker method of encryption, "convergent encryption" derives the key from the file content itself and means an identical file encrypted on different computers result in identical encrypted files. This enables the cloud storage provider to de-duplicate data blocks, meaning only one instance of a unique file (such as a document, photo, music or movie file) is actually stored on the cloud servers but made accessible to all uploaders.

From a security point of view however this is problematic since a third party who gained access to the encrypted files could thus easily determine if a user has uploaded a particular file simply by encrypting it themselves and comparing the outputs.

Further, there is a theoretical possibility that organizations or a government could obtain a warrant to access the cloud storage provider's servers and gain access to the encrypted files belonging to a user. By demonstrating to a court how applying the convergent encryption methodology to an unencrypted copyrighted file produces the same encrypted file as that possessed by the user would appear to make a strong case that the user is guilty of possessing the file in question and thus providing evidence of copyright infringement by the user.

Ownership security. Who owns the data the user uploads? Will the act of uploading change the ownership? For example, the act of uploading photos to Facebook gives Facebook an irrevocable, unlimited license to sell the user's picture.

Regulations. Security of stored data and data in transit is a significant concern when storing sensitive data at a cloud storage provider. Users with specific records-keeping requirements, such as public agencies that must retain electronic records according to statute, may encounter complications with using cloud computing and storage. For instance, the U.S. Department of Defense designated the Defense Information Systems Agency (DISA) to maintain a list of records management products that meet all of the records retention, personally identifiable information (PII), and security (Information Assurance; IA) requirement. Further, the legal aspect, from a regulatory compliance standpoint, is of concern when storing files domestically and especially internationally.

Copyright Issues. Piracy and copyright infringement may be enabled by sites that permit filesharing. For example, the CodexCloud ebook storage site has faced litigation from the owners of the intellectual property uploaded and shared there, as have the GrooveShark and YouTube sites it has been compared to.

Searching in Remote Encrypted Data

Once data is encrypted and outsourced to a curious, potentially malicious untrusted provider, clients may want to access it in more expressive ways than simply downloading it. At the very least, clients may desire the ability to search for and selectively retrieve only data items matching certain criteria. The problem has been studied extensively in academic and research circles under the umbrella "Search in Encrypted Data" (SED).

A majority of work in SED has focused on enabling a client to have the third-party server(s) perform certain search functionality on his encrypted data. More plainly, a SED scheme allows third-party server(s) to search on behalf of a client without the need to recover the plaintext data while preventing the server(s) from learning any plaintext information.

Given a data item, which can be of various forms (e.g. an email, a document, a video clip, etc), search can be done in two ways:

Full Domain Search.

Sequentially parses every data item in order to test some criteria. For instance, a search may test whether some term appears more than a threshold number of times or whether another term does not appear in the content. Full-domain search requires linear operations to cover all data items, and is flexible in the sense that the criteria can be anything and be defined on the fly. The downside is its inefficiency when the data items are of big size.

Index-Based Search.

In index-based or keyword-based search on the other hand, every data item is firstly characterized by a list of keywords which are then used to build a search index for the data item. Later, when a search takes place, the criteria will be tested based on the indexes instead of the contents of data items. In the literature, there are two basic ways to construct indexes, namely forward indexes (mapping data items to the set of keywords they contain) and inverted indexes (mapping keywords to the set of data items they contain). With this approach, search can be done much more efficiently since it does not need to go through the contents of all data items. The downside is that search criteria may not be as flexible as in the case of full-domain search and the performance will depend on the selection of keywords and how the index is constructed and maintained.

Most SED schemes assume that a search is either a sequential scan in the encrypted data or a direct match in an index.

The above description assumes that no encryption is done on the data and indexes. Depending on the intended search functionality, SED in the full-domain setting will encrypt the data items in certain block-wise manner, while SED in the index-based setting will encrypt the indexes and keywords.

Symmetric Vs. Asymmetric Setting.

Based on the answer to the questions "Who can contribute searchable data in the outsourced database?" and "Who can issue search queries to the third-party server(s)?" SED schemes can be also be divided into two categories: symmetric-setting and asymmetric-setting.

In the symmetric-setting, only the client is able to generate the searchable contents, generate valid search queries, and decrypt the encrypted contents. The SED scheme in some instances assumes full-domain search and the encryption is word by word.

In the asymmetric-setting, every entity should able to generate searchable contents without any explicit authorization from the client. By default, only the client can generate valid search queries and decrypt the encrypted contents. Note that in some instances, such an SED formulation may be referred to as PEKS ("public key encryption with keyword search").

The concept formulation and scheme construction of PEKS are generally limited in many aspects. For example, PEKS typically only considers the encryption of single keywords and only supports exact matches. In addition, with respect to index-based SED schemes in the asymmetric-setting, because the keyword set is certainly required to be public so that every entity can generate searchable contents, it has been shown that a server can mount a straightforward offline message recovery attack to recover the keywords from the encrypted data.

By definition, a PEKS scheme only allows the server to search the client's ciphertexts, and there are scenarios two clients may want a server to perform certain forms of search in their joint database. While the concept of PKEET (public key encryption supporting equality test) has been introduced, a drawback is that any entity can perform the search without any explicit authorization.

In PEKS and most of its variants (and SED in the symmetric-setting as well), the server always knows the search results, namely the documents matched by every search request. This is often unacceptable as it leaks some information about the encrypted documents (and associated keywords).

For most SED schemes a search request will typically require the server to sequentially scan all the encrypted data items or index entries. While the concept of efficiently full-domain searchable deterministic encryption which allows any entity to generate searchable contents and generate trapdoors to search in encrypted contents (generated by all entities) while only seeing a logarithmic number of data items or index entries is known, the downside is that the ciphertext is deterministic that an adversary can test any guessed plaintext by an encryption operation.

For almost all SED schemes in the asymmetric-setting, including some constructions of the deterministic encryption, search is done in the encrypted "index" instead of the ciphertexts of messages.

The concept of public key encryption with delegated search (referred to as PKEDS) which allows a server to search directly in the ciphertext is known. A typical drawback with this formulation is that the security model only considers the one-wayness property against a server.

SED Security Models: Index-Based SED Schemes.

It is worth noting that most SED security models only focus on the confidentiality of data, namely preventing the server(s) from learning any plaintext information. In practice, integrity may also be an important concern for SED, but it has not attracted much attention so far.

For an index-based SED scheme, information leakage may come from three sources, namely the index, the encryption, and the query results. Correspondingly, there are three types of privacy concerns, including index privacy, encryption privacy, and query result privacy.

Index privacy postulates that indexes should not leak unnecessary information about the encoded keywords. Ideally, an index should be constructed in such a way that the server only learns whether the encrypted query is satisfied or not.

Intuitively, an index should not allow the server to recover the encoded keywords. However, how much information an index leaks also depends on how it is encrypted and how the queries are encrypted.

Query encryption privacy deals with the fact that encrypted queries should not leak unnecessary information about the encoded predicates. Ideally, an encrypted query should only allow the server to tell whether the encoded query predicate or keyword is satisfied by the index or not. The server should definitely not be able to recover the encrypted keyword for example.

Index privacy and encryption privacy should be considered simultaneously since they are intrinsically linked in the process of searching in the index.

Query result privacy, mandates that search queries should not leak unnecessary information about the searched results to the server. It is not difficult to imagine that, in a specific application scenario, the pattern of how a data item or index entry matches the client's search request can already leak some information about the data item.

With respect to all these privacy concerns, the adversary (server) is called "honest but curious" (or "semi-honest"), if it correctly executes the protocol algorithms while also trying to obtain private information. Essentially, the server will not deviate from the protocol specification and e.g., forge invalid results.

Among the security models available for SED in this setting, the strongest ones cover index privacy and trapdoor privacy simultaneously. However, none of them considers query result privacy.

SED Security Models: Full-Domain SED Schemes.

For a full-domain SED scheme, regardless the setting (either symmetric or asymmetric), information leakage may come from three sources, namely the actual encrypted data ciphertext, the encrypted queries, and the query results. Ciphertext privacy postulates that the encrypted data should not leak unnecessary information about the encoded data items. The other two types of privacy properties are similar to those for an index-based SED scheme described above.

Practicality/Security Analysis.

In the plaintext case, both full-domain search and index-based search can be easily implemented and they are usually supported at the same time. However, for obvious reasons, once data is encrypted, SED schemes are suffering from significant constraints in the types of queries they can accommodate and the associated achievable throughput. As to security, the above analysis has shown that most SED schemes do not achieve the strongest security we may hope for and in fact feature significant weaknesses. Moreover, as will be shown below, even in the strongest security models, a SED scheme may still put a client's privacy at risk in reality.

Practicality/Security Analysis: Full-Domain SED Schemes.

For full-domain SED schemes, the first practical concern is the encryption block size, due to the fact that encryption techniques, either symmetric or asymmetric, only take a binary string of certain length as input. This means that data items need to be split into blocks before encryption is done in a block-wise manner. For instance, every word may be treated as a block and only exactly matching is supported. In order to support more complex search, the data item may need to be encrypted letter-wise instead. Downgrading encryption granularity may result in additional serious security issues, such as more severe statistical analysis. In practice, the encryption block size will not only be limited by the encryption algorithms, it also depends on the search criteria to be supported.

Moreover, there can be many different types of data items, including media such as photos, videos, and audios. How to support a variety of search criteria on different types of data items without further deteriorating security and efficiency in a SED setting is unclear.

Another concern is the computational and storage efficiency, in particular for SED schemes in the asymmetric-setting. For instance, if encryption is required word-wise for a data item with N words, then the encryption will take an O(N) number of public key operations (e.g. exponentiation and pairing) and the storage may become significantly larger than the plaintext case. (Note: O(N) is used to denote a behavior linear in N. An algorithm has complexity O(N) e.g., if there exist constant values a and b such that the running time of the algorithm can be expressed as (aN+b)).

The even more severe efficiency bottleneck may lie in the fact that every search request in a single encrypted data item will also take O(N) operations, which may be overwhelming for even a data item of moderate size. In contrast, if a more efficient SED scheme is used, a search may only require logarithmic number of integer comparisons (O(log(N)). But the downside is that such an "efficient" scheme is insecure in that it achieves only a "somewhat" one-wayness property.

Yet another concern is that for some schemes in the asymmetric setting, the encryption of every data block contains two parts: one part is a standard encryption used for data recovery, the other part is an encryption of a checksum of the data block used for searching. This structural construction results in a significant linkability issue, in which a server may link different parts of the ciphertext by looking for checksum matches. Further, a malicious sender may compromise the checksums etc.

Practicality/Security Analysis: Index-Based SED Schemes.

Compared to full-domain SED schemes, index-based SED schemes face other challenges. The index for a data item is constructed based on related keywords. For many applications, the keyword space may be of limited size and the distribution of keywords is non-uniform in the plaintext and often known to the adversary or even public knowledge. This severely impacts security.

By observing client search results, the server may infer the embedded search query keywords and the keyword information in the indexes. For instance, if numerous search queries match the same index entry, the adversary/server can infer that the index contains some keywords which have high distribution probabilities in the keyword set. This can be linked to public knowledge such as e.g., current new events and associated keywords to break the confidentiality of the index entry.

SED schemes in the asymmetric-setting are generally vulnerable to the offline message recovery attack and existing solutions suffer from efficiency and usability problems.

Another concern is information leakage from indexes. For a simple forward index, suppose a SED scheme straightforwardly encrypts both the data items and their associated keywords. The server and any other entity can notice how many keywords are associated with each data item, and they may infer that the more keywords a data item has the more important it is to the client. This problem can be mitigated by using a predefined and fixed dictionary of size x, and index entries of x bits, each bit showing whether its corresponding keyword is in the related data item or not. But such a mitigation technique his leads to a significant waste of space and the inability to handle new keywords. Some schemes also require fixing the upper bound of the number of possible keywords from all data items and some add random values to every index to hide keyword occurrence differences.

If an inverted index SED scheme straightforwardly encrypts the keywords and their associated data items then, the server and any other entity know how many data items are associated with each keyword, and may infer that popularity of encrypted keywords. The issue becomes more obvious when the keywords are from a set of limited size and are not uniformly distributed. To mitigate the problem, a SED scheme may try to add dummy values to pad the indexes in the case of a forward index or to pad item identifiers in the case of an inverted index. Unfortunately, this mitigation measure may cause issues when the indexes need to be updated (e.g. new data items or new keywords to be added).

Yet another concern is the linkability issue between the data items and their indexes. A malicious party may generate stored contents and indexes in a malicious manner to gain some benefits. In this case, the malicious party refers to any entity except for the receiver and the server, which will often be regarded as semi-trusted in practice. All existing index-based SED schemes in the asymmetric-setting may suffer from this problem. Indeed, this problem falls beyond all existing security models.

In addition, for index-based SED schemes, it is unclear how to update inverted indexes, since straightforwardly adding new index information to old indexes will leak information to the server. Proposed methods to add new indexes, which will be generated based on new secret keys, may result in different index segments which can be only searched by using certain secret keys which may not be available to previous clients.

More General Search in Encrypted Data Issues

The client may want a SED scheme which supports queries with flexible search criteria. For instance, exact matching, fuzzy matching, and conjunctive keywords should be supported at the same time. No existing index-based SED scheme can provide this functionality. Generally speaking, SED schemes only support certain types of search criteria.

Also, with few exceptions, query result privacy has not been touched upon in SED schemes, although it is a significant practical concern.

Besides confidentiality, data integrity and query correctness is another serious concern in practice. Clients may need technological assurances that e.g., the server does not provide an incomplete or incorrect result.

Above, we have categorized existing SED schemes, reviewed their security models, and provided practicality analyses which showed that significant security and practicality concerns. A large number of practical security compromises and leaks exist, even for schemes supposedly theoretically secure. Finally, all existing SED schemes feature speeds and overall throughputs that are simply infeasible for most practical scenarios. They do not scale. As a result, no commercially available real-world implementations exist.

Traditional Cloud Service Deployment

Any cloud storage system that aims to provide search capability may comprise a number of basic components including an access control module (ACM), and a data storage module (DSM).

The ACM handles access control to the stored data and ensures only authorized users may access it. The DSM manages data storage logistics, including its replication, de-duplication, backups, long-term storage etc.

For obvious reasons, in traditional cloud storage all the modules and functionality including both the ACM and the DSM are placed in the cloud. Users may access the service through "thin" clients such as web browsers or desktop applications that expose the storage service to the users' desktops as a local "drive".

A cloud storage system providing search capability may require a number of additional components including an indexing module (IDX), and a search module (SRCH).

Problems with Traditional Server-Centric Design.

In traditional cloud storage services that also provide search capabilities (e.g., Dropbox) both the IDX and the SRCH are also placed in the cloud. Users may access the search functionality similarly to the main storage functionality, through thin web or desktop clients.

This server-centric design has been adopted also by virtually all the existing SED work. This has resulted in completely impractical, questionably secure, often severely security-compromised, commercially unfeasible ideas.

Thus, there remains a need for a method for managing an encrypted cloud storage system so that the encrypted data files are securely searchable by clients and securely shareable between clients. It would be helpful if such a secure searchable and shareable remote storage system and method was operative to leverage client side processing to ensure complete privacy of the stored data, its metadata, and queries related to the stored data. It would be additionally desirable for such a secure searchable and shareable remote storage system and method employed authentication techniques which allowed the synchronization of shared data between a plurality of client devices for a single or plurality of users.

SUMMARY OF THE INVENTION

A cloud storage system for encrypted data files which utilizes client side processing to enable search capability of the stored data, allow the synchronizing of stored data between multiple discrete devices, and allow sharing of stored data between multiple discrete users. The secure searchable and shareable remote storage system and method comprises at least one networked remote computer server which receives and stores encrypted data and manages access thereto and a client device configured with a client side app to index data to be stored, upload secured data and related information, perform searches on the stored data and/or related information locally, and implement cryptographic protocols which allow the stored data and related information to be synchronized with other desired client devices.

As demonstrated in existing attempts to provide enhanced security of data in cloud settings, achieving truly practical and secure designs that are also efficient may not really be possible with a server-centric design in which search operations need to be performed on encrypted data and thus become extremely computationally expensive and necessarily limited in expressiveness by current cryptography. Indeed, an efficient design may necessarily need to involve clients more extensively as illustrated herein since trusted client-side search code may directly access mostly plaintext data and thus may operate orders of magnitude faster than the equivalent server code which may access encrypted data only.

It is therefore an object of this invention to provide a secure searchable and shareable remote storage system and method which allows the storage of encrypted data files which remain securely searchable by clients and securely shareable between clients.

It is another object of this invention to provide a secure searchable and shareable remote storage system and method operative to leverage client side processing to ensure complete privacy of the stored data, its metadata, and queries related to the stored data.

It is yet another object of this invention to provide a secure searchable and shareable remote storage system and method which employs authentication techniques which allowed the synchronization of shared data between a plurality of client devices for a single or plurality of users.

These and other objects will be apparent to one of skill in the art.

DETAILED DESCRIPTION OF THE INVENTION

Insight: Leveraging Client-Side Processing.

For scalability, practicality and strong security, it is believed the cloud server may not be entrusted with search-related work. Instead, the clients may do this work on unencrypted or partially encrypted data, with the server available to aid in enforcing access control, storing the data, handling transactions, backing it up, and generally acting as a communication conduit between clients. Applicant's invention as described herein therefore operates to distribute the functionality of several key modules, including IDX and SRCH, across both the clients and the cloud instead of or in conjunction with a server-centric design.

In such an implementation, the cloud would be allowed to securely handle the data storage DSM and access control ACM functionality without being granted access to the underlying user data. Then, the computationally expensive server-side search on encrypted data associated with the SRCH and IDX modules, may be replaced with comparatively cheap client-side SRCH and IDX computation which can now be performed on mostly unencrypted data by the clients themselves.

Deployment Scenario.

In a typical deployment scenario, a customer may have data structured in a number of folders and individual files (collectively referred to herein as "files"). The customer may desire to use the services of an available cloud storage system. The customer, however, may not trust the provider of an available cloud storage system. Given the chance to get away undetected, the cloud storage service provider and other parties (collectively, "adversary") may have incentives to:

read some or all of her file-related data or associated meta-information, including file and folder names ("curious" adversary).

illicitly alter some or all of her file-related data or associated meta-information, including file and folder names ("malicious" adversary).

Nevertheless, the customer may be interested in a solution that allows her to:
- securely store her files in the cloud
- securely replicate ("synchronize") her files across multiple devices (e.g., laptop, tablet, desktop, smartphone etc.)
- securely share some or all of her files with other parties (e.g., her friends, co-workers, or corporate employees in a certain department etc.)
- search in some or all of her files
- search in some or all of the files shared with her by others
- not be required to retrieve the files before being able to search in them
- hide any file-related data or meta-information from unauthorized parties, including the service provider (defeat against "curious" adversary)
- detect the unauthorized modification of any file-related data or meta-information by any parties, including the service provider (defeat against "malicious" adversary).

Figure 1:
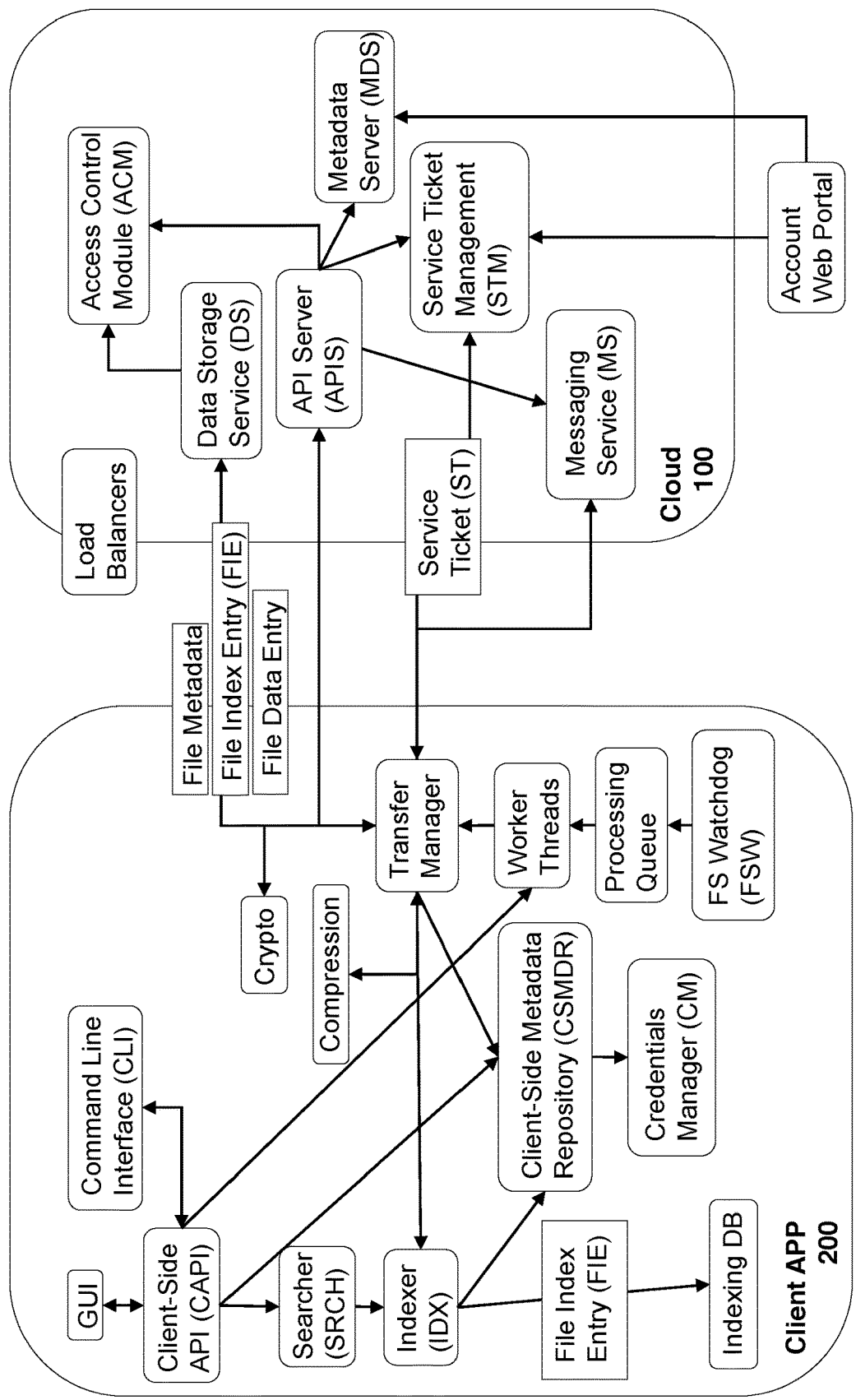
FIG. 1 shows the components of a secure searchable and shareable remote storage system built in accordance with the preferred embodiment of the present invention.

Referring now to the drawings and in particular FIG. 1, in one embodiment, a secure searchable and shareable remote storage system and method operates through a client-side app and a cloud system 100 (or "cloud"), each of which is connected to a computer network so as to allow the transfer of electronic data between client-side app and cloud system 100. It is appreciated that the client side app would generally be operated from a network enabled computing device 200, such as a desktop computer, laptop computer, or handheld device (i.e. smartphone, tablet, etc.), while the cloud system 100 would typically define a conventional cloud storage system.

The secure searchable and shareable remote storage system and method defines an Encrypted Cloud Storage System with Search (ECSSS) which includes components from both the cloud system 100 and computing device 200, namely: a client-side app (APP), API server (APIS), data storage (DS), meta-data server (MDS). APP may include an indexing component (IDX), and a search component (SRCH). Additionally APP may comprise one or more user interfaces—including a graphical user interface (GUI), a command line interface (CLI), or both.

Further, APP may include a file system watchdog (FSW), a client-side metadata repository (CSMDR), a credentials manager (CM), a transfer manager (TM), and other components which will be discussed below, which may be embodied in a synchronization module.

For full security, to prevent the cloud from learning any file-related information, IDX, SRCH and most other unencrypted data processing are run client-side.

Shares.

In addition to replicating ("synchronize") their files across multiple devices (e.g., laptop, tablet, desktop, smartphone etc.), users may also share some or all of their files with other parties (e.g., her friends, co-workers, or corporate employees in a certain department etc.). For simplicity of exposition, we consider the unit of sharing to be a folder. A folder "shared" by one user with at least one other user will be called a "share". It is appreciated, however, that an item shared may define a file or a folder.

Share Permissions.

It is contemplated that each share may have a number of permissions associated with it, including read, write, re-share, etc. For example, a user may provide access to one of her folders to another user with only a read permission through a read-only share.

Root Share.

Also for simplicity of exposition we will assume each user has designated a special folder on each of her client devices as a "root share", a special folder, which delimits the files the ECSSS accesses from the other files on the devices. The user may have other files stored on the local hard disks, but the ECSSS will only consider the files and folders placed in the root share. The root share folder will also contain the folders shared by other users with the current user ("shares"). Users can mark folders in their root shares as shared or not shared. After marking a folder as shared, a user becomes its "share owner". Share owners can specify share permissions for other users or groups—for example read or read-write permissions. In one embodiment, a share module in the APP enables the management of shares, including the sharing of file sand the setting of permissions.

Groups.

Using the APP, users can create groups to simplify sharing of files. A group consists of a group owner, and a list of users who are members of the group.

Trusted User List.

In order for two users (Alice and Bob), to securely share files, Alice and Bob need to have each other's public keys. Alice and Bob obtain each other's keys securely through an authenticated channel before storing them in their trusted users list.

It is appreciated that a user may have multiple client APPs. Each client APP may comprise ECSSS components. In the following we discuss several of these components.

File System Watchdog (FSW)

The FSW is in charge of observing and timely reporting of file data and meta-data changes within a client's root share, such as, for example, a file edit, a file deletion, a renaming of a folder, a move of a folder from one place to another, etc.

Upon observing a file change, the FSW en-queues the change for processing by the TM. The FSW can delay handing off changes to the TM in the event that the change matches a FSW filter, i.e. the change refers to a file that has been recently deleted, frequently modified, or the rate of incoming events is too high.

In addition, the TM interacts with the FSW to reschedule changes, based on dependencies, i.e., the TM may decide to reschedule a file change back to the FSW, because the parent folder of the file has not yet been uploaded—after the parent is uploaded, the FSW will give back the file to the TM for uploading.

Indexing (IDX).

As mentioned above, for full security, to prevent the cloud from learning any file-related information, IDX may be run client-side.

Signatures.

While using the APP, the APP will generate signatures for some events, i.e. creating a new share, adding a user or group to a share. Each signature takes as input different parameters, and each signature type has a different unique constant message prefix which determines the message purpose, to prevent the server from swapping signatures for events, which use similar parameter types. Defined prefixes include: PREFIX_ROOT_SHARE, PREFIX_USER_TO_SHARE, PREFIX_USER_CREATE, PREFIX_SHARE, PREFIX_SHARE_CREATE, PREFIX_USER_TO_GROUP, PREFIX_GROUP_TO_SHARE, PREFIX_GROUP_KEY, PREFIX_PUBLIC_KEY, PREFIX_UN_SHARE.

Notification Service.

The APP needs to download updates from the APIS, since data that the user has access to, can be uploaded from many different APPs installed on other machines. To this end, the APP could naively ask the APIS every fixed period of time (so called polling), for the list of changes. However, polling would result in either large latency, if the fixed period of time is very big, or if the fixed period of time is small, small latency, but too much resource usage on the APP and APIS. In order to achieve both small latency, and low resource usage, the APIS includes a notification server (NS), and the APP includes a notification receiver (NR).

The NS maintains a list of so called "exchanges" corresponding to entity IDs, for example user, group, or share IDs. When an event occurs on the APIS, for example an existing file is updated in a share, the APIS sends an event message to the NS exchange corresponding to the share ID involved in the update.

The NS also maintains a list of so called "queues" corresponding to each installed APP. When an APP starts, it connects to its unique queue on the NS, and tells the NS, which exchanges it would like to "subscribe" to and connect to its queue. This choice is done based on the APPs CSMDR, in which the APP can check which shares, and groups it has access to, as well as the synchronization options the user has specified. The NS checks with the MDS that the APP has permission to access the specified exchanges, and connects them to the queue.

When a message arrives at an exchange, it is broadcast to all subscribed queues. APPs connected to the queues process the received message, by decoding its type and content—for example a message indicating that a share just had files updated.

The messages that the NR receives include the following:
User messages, with information related to the user's account. For example, a warning message that the user has reached her storage quota, or that her billing information is outdated. The messages may be forwarded to the APPs GUI or CLI component.
Group synchronization messages, for when a user is added to a group, or a group is added to a share.
Share synchronization messages, for when a file is updated in a share, a user or group is added to a share, a new share is created, an existing share is unshared
Key synchronization messages, for when a user trusts another user's public key Creating User Account.

When a user creates their account for the first time, their client APP generates keys and signatures to store on the server (so that the user can later log in and re-download all their data after providing only a password or private key) as follows:
The user provides an username (EM) and a service token (ST)
The username uniquely identifies a user
The service token is used by the APIS to verify the user's billing status in a separate billing service
The APP generates random values for:
user ID UID
root share ID SID
root share keys SK, SIK, SVK, which are secret symmetric keys
an asymmetric public/private key pair KP
Used to uniquely identify the user during synchronization and file exchange
an asymmetric public/private key pair SSLKP
Used to uniquely identify the user to the APIS
recovery key RK If the user provides a password PASS and/or specifies the intent to use recovery key RK, the app performs the following:
Generate key PASS_K using a key derivation function KDF with PASS and a random initialization vector PASS_IV as input
Compute PASS_H, a cryptographic hash of PASS_K
Generate key RK_K using a KDF with RK and a random IV RK_IV as input
Compute RK_H, a cryptographic hash of RK_K
Encrypt KP using authenticated encryption with PASS_K
Encrypt KP using authenticated encryption with RK_K
PASS_H and RK_H are computed in order to allow the server to verify the user's identity during login, without revealing the secret PASS, PASS_K, RK, or RK_K values The APP generates signatures:
The share signature (SSIG), which is a signature of: (PREFIX_ROOT_SHARE, SID, SK, SIK, SVK) signed using the user's private key, which is used to verify that the secret keys and share ID correspond to the same share.
The share member signature (SMEM), which is a signature of: (PREFIX_USER_TO_SHARE, SID, user's ID, and permissions read and write) signed using user's private key, signing for user's read and write permissions to S.
The user create signature (UCS), which is a signature of: (PREFIX_USER_CREATE, UID, EM) signed with the user's private key, signing for their user ID and username tuple.

The APP performs encryption of
The new share keys (SK, SIK, SVK), encrypted using user A's public key
The key pair KP using PASS_K, RK_K, and authenticated encryption with a random IV, if PASS_K and/or RK_K were generated The APP then sends to the server: EM, ST, UID, SID, public key of KP, public key of SSLKP, all encrypted, signed values, PASS_H, PASS_IV, RK_H, RK_IV
The server replies with a failure or success message, and a certificate for SSLKP (CERTSSLKP), used to identify the client during future API calls
The APP stores into CSMDR the values of UID, SID, SK, KP, SSLKP, CERTSSLKP
The APP starts synchronization Logging into an Account.

When a user installs a client APP on a new machine, they need to provide credentials to the server to verify their identity, and obtain the signatures and necessary encrypted values to bootstrap their client. The login process is interactive and works as follows:
The client enters their username and chooses to login and may provide at least one of the following: private key of the previously generated KP, password, or recovery key
The APP generates a new SSL key pair SSLKP
If the user chooses to login with the private key of the previously generated KP, the server replies with a random value, which the APP signs with the private key of KP and sends back to the server along with the public key of SSLKP. The server may then verify the signature using the public key of the KP which is stored in MDS and, if verification is successful, the server replies with UID, SID, the share (SSIG), share member (SMEM), and user create (UCS) signatures, the encrypted keys SK, SIK, and SVK, and CERTSSLKP (certificate for SSLKP)

If the user chooses to login with either a password or recovery key:

The server replies with either PASS_IV or RK_IV. Using the KDF, the APP can then generate PASS_K or RK_K, and from that PASS_H or RK_H, and replies with that to the server along with the public key of SSLKP. The server can then verify that the received value matches the previously stored value for this client—either PASS_H or RK_H provided during user account creation above. If the match is successful, the server replies with UID, SID, the share (SSIG), share member (SMEM), and user create signatures (UCS), the encrypted keys SK, SIK, SVK, KP, and CERTSSLKP (certificate for SSLKP).

The APP can then decrypt the server-provided encrypted copy of the user's KP using either PASS_K or RK_K.

The APP decrypts the root share keys SK, SIK, SVK using the private key of KP

The APP verifies the share (SSIG), share member (SMEM), and user create (UCS) signatures with the public key of KP The APP saves in CSMDR the values EM, UID, SK, SID, SIK, SVK, KP and certificate CERTSSLKP The APP starts synchronization Position Counters.

The client APP needs to download updates from the APIS, since data that the user has access to, may be uploaded from many other different client APPs, e.g. installed on other machines. To this end, the APP could naively ask the APIS to return the entire list of entries the user has access to. However, this would be inefficient in operation. In order for the APP to efficiently receive changes from the APIS, the list should only include new events that the APP has not yet received. To facilitate this, update operations involve a monotonically increasing position counter stored in both the MDS and the CSMDR, which works as follows:

When the APIS receives a request from the APP that modifies information in MDS, it increments the position counter for the corresponding user, group, or share, that has been modified, and stores the position with the information for that update in the MDS.

The APP maintains a list of position counters in CSMDR, corresponding to the users, groups, and shares that it wants to synchronize. When asking the APIS for the list of changes that occurred since the last time the APP asked for the list of changes for a given user, group, or share, the APP sends it position counters to the APIS. The APIS only sends back the list of events that occurred after the APP's position counters. After successfully processing the changes, the APP updates and stores its position counters in CSMDR.

The various type of position counters include:

A per share file position counter (FPC), incremented for the given share, whenever a file is updated in a share A per share delete position counter (DPC), incremented for the given share, when file entries are removed in a share A per share user position counter (UPC), incremented for the given share, whenever a user is added to or removed from a share A per share group position counter (GPC), incremented for the given share, whenever a group is added to or removed from a share A per user user share position counter (USP), incremented for the given user, whenever a user is added to or removed from a share A per user user group position counter (UGP), incremented for the given user, whenever a user is added to or removed from a group A per group group member position counter (GMP), incremented for the given group, whenever a user is added to or removed from a group A per group group share position counter (GSP), incremented for the given group, whenever a group is added to or removed from a share A per user user key position counter (UKP), incremented for the given user, whenever a user trusts someone else's key, or someone else trusts the user's key Group, Share, and Key Synchronization.

For improved performance, the APP stores in the CSMDR information about which shares and groups the user is part of. For each group that the user is part off, the APP stores in CSMDR the list of all the members of those groups, as well as all the shares and permissions that those groups have. For each share that the user has access to, the APP stores in CSMDR the list of all the users and groups and their permissions to those shares. The APP also stores the list of users and keys that the user has trusted.

Delete Events and Position Counters.

When a create or update event occurs, (i.e., a new file is created, an existing file is updated, a user is added to a group), the position counter is stored in the server-side MDS along with the new event. A naïve delete implementation would for example simply delete the server-side entry corresponding to the file to be deleted. However, this may prevent the client APP from ever receiving that event. Instead, during delete events (i.e., file delete, user removal from a group), the existing row is marked as "deleted", and the incremented position counter is stored along with it. This allows for the APP to receive delete events efficiently.

If delete events were to be stored forever, the MDS would grow without bound. To avoid this, the APIS occasionally instructs the MDS to completely remove file entries marked as deleted from a given share. After the entries are removed, the share DPC is incremented. During file synchronization, the APP sends its DPC to the APIS, and if they mismatch, the APIS responds with a message informing the APP to "filter its missed delete events". This involves the APP sending the list of all of its file IDs for that share to the APIS. The APIS filters this list, returning the file IDs which the APP sent, but were not found in MDS. Finally, the APP deletes the files corresponding to the file IDs returned from the APIS, from its local file systems and CSMDR.

File Synchronization.

The MDS maintains a per-share monotonically increasing file position counter (FPC), updated on each file operation within the share. When a file entry is modified in MDS, the incremented position counter is stored along with the entry, so that the APP can query the APIS for a list of changes, which can be returned from the MDS sorted by increasing position.

File Position Counter Properties.

Due to the hierarchy of files within a share, some important properties must be maintained in regards to the ordering of operations and file positions, for synchronization to work across APPs.

Every file entry within a share in MDS must have a unique file position.

The parent file entry D of a file F must exist before F can be created

If D is not deleted, then all children files C will have a position greater than their parent, which implies that the APP will always receive the event to create D before any events for C To be able to delete a file entry D, all of its children C must first be deleted Garbage Collection of Old Files.

Every user has a quota for the number and total size of files they can store in MDS and DS. As mentioned above, when a delete event happens, the data for that file might not immediately be deleted—instead the file may be marked as deleted, and still count towards the user's quota. This permits the user to use the APP to browse the list of deleted files, as well as the revision history for still existing files, and restore those files back into existence. However, at some point those old deleted files will need to be completely removed, in other words "garbage collected", in order to make room for new files and updates. Through the APP, the user can configure a policy to be stored in MDS, which the APIS will use to determine which files and in what order to garbage collect from the MDS and DS. The policy options may include:

Specifying priority of files to delete based on size (i.e. largest files first), date (i.e. oldest files first)

Specifying which shares, directories, or files to first collect from

Specifying to preserve some history for files (i.e. preserve at least one version of a file for every week that it existed)

Client APP Crosstalk to Defeat Forking Attacks.

Although the synchronization protocol includes verification of file contents, as well as signatures for most user actions, a malicious server might decide to replay old files and events, or pick and choose which files in a share to show to some clients but not to others. To prevent this from happening, client APPs of the same or different users, who have access to shared files, user, or group information, can automatically and periodically communicate with each other through the APIS and NS, in order to exchange information on their view of the files. This is feasible, since every APP has a public-private key pair, and users exchange their public keys through an authenticated channel before they start sharing files.

The user can verify that all his APPs installed on different machines have the same contents. The exchange might proceed as follows:

APP A of user U generates a time-stamped list based on its information in CSMDR, of shares IDs, share keys, file IDS, file hashes, group IDs, group keys, share permissions, and encrypts it with a random secret key K. The APP then encrypts K with U's public key, and sends the encrypted values to the APIS, asking it to forward the list to another of U's APPs installed on some other machine. APP B of user U receives the list, decrypts and verifies it, compares it to its own information in CSMDR, and replies with a time-stamped, encrypted and signed message with U's key-pair, to the APIS message agreeing with the list, or listing the differences. APP A receives the message, and if there are differences, reports them to U through the GUI.

The user U can verify that for a given share S, to which U has access, that other users who also have access to the share, have the same list of files. The exchange might proceed as follows:

APP A of user U generates a time-stamped list based on its information in CSMDR, of the share keys, file IDs, and file hashes for share S, encrypting the list with a random secret key K. The APP then chooses a random user W from the list of users who have access to S, based on its information in CSMDR, and encrypts K with that user's public key. APP A then sends the encrypted values to the APIS, asking it to forward the request to an APP B belonging to user W. B receives the list, decrypts and verifies it, compares it to its own information in CSMDR, and replies with a time-stamped, encrypted, and signed message with U's key-pair, to the APIS message agreeing with the list or listing the differences. APP A receives the message, and if there are differences, reports them to U through the GUI.

File Synchronization Operations

New File.

Figure 2:
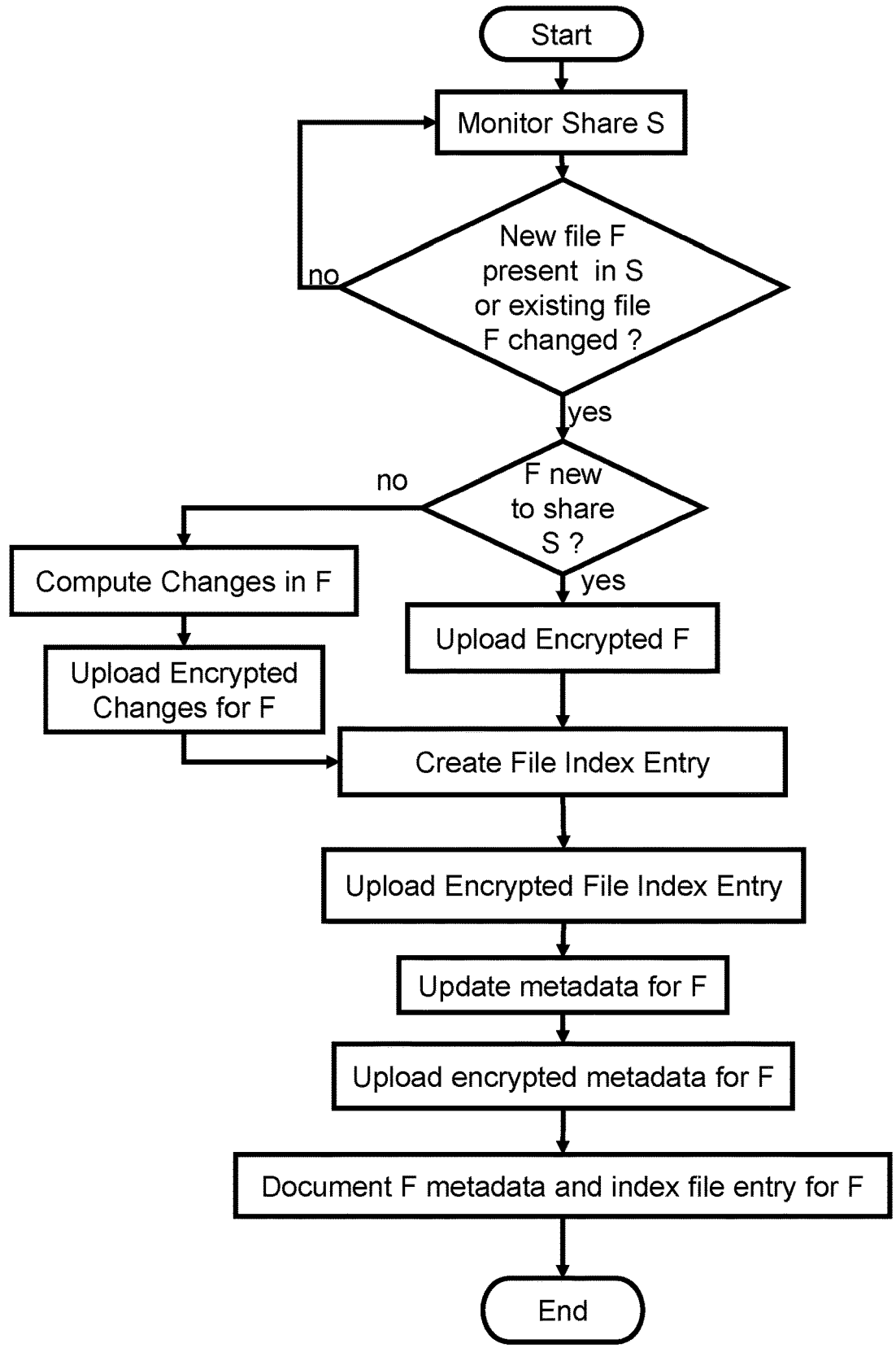
FIG. 2 illustrates the steps through which a file is synchronized on a secure searchable and shareable remote storage system built in accordance with the preferred embodiment of the present invention.

Referring now to FIG. 2, when a new file F appears in a customer's files—e.g., created by the customer or copied from elsewhere into the customer's "root share":

the FSW notifies the TM module of the new file F the TM queries CSMDR with F's attributes (file size, modified time, content hash) in order to detect if F is a new file, or if it has been moved or copied from another already uploaded file E If the file is a new file, then the TM uploads F to the DS using the APIS the IDX module computes a file index entry (FIE), e.g., the FIE may include unique keyword terms, their associated frequency, relative location etc.

the TM uploads FIE to the DS using the APIS

If the file was moved or copied, then the TM may upload the data as if it's a new file (above), or ask the APIS to duplicate G and copy it to F in the DS, in order to avoid re-uploading the IDX module computes a file index entry (FIE), e.g., the FIE may include unique keyword terms, their associated frequency, relative location etc.

After the upload finishes, the TM commits the new entry in the MDS through the APIS If the MDS already contains a file at location F, then the APIS will throw an error to the APP, and refuse to save the new file. The APP will then rename the file, and try again After successfully saving the file in the MDS and DS, the CSMDR is annotated with information about F (file type, size, content hash, MDS provided version number, etc.) and the FIE is handed off to the IDX For files that are folders, the TM works with the FSW to ensure that recursively, all new file events concerning children (e.g., files contained in sub-folders) are processed after any parent (e.g., the sub-folders themselves) new file events.

File Update.

In the case of an update to the file data:

The FSW notifies the TM of the modified file F

Figure 3:
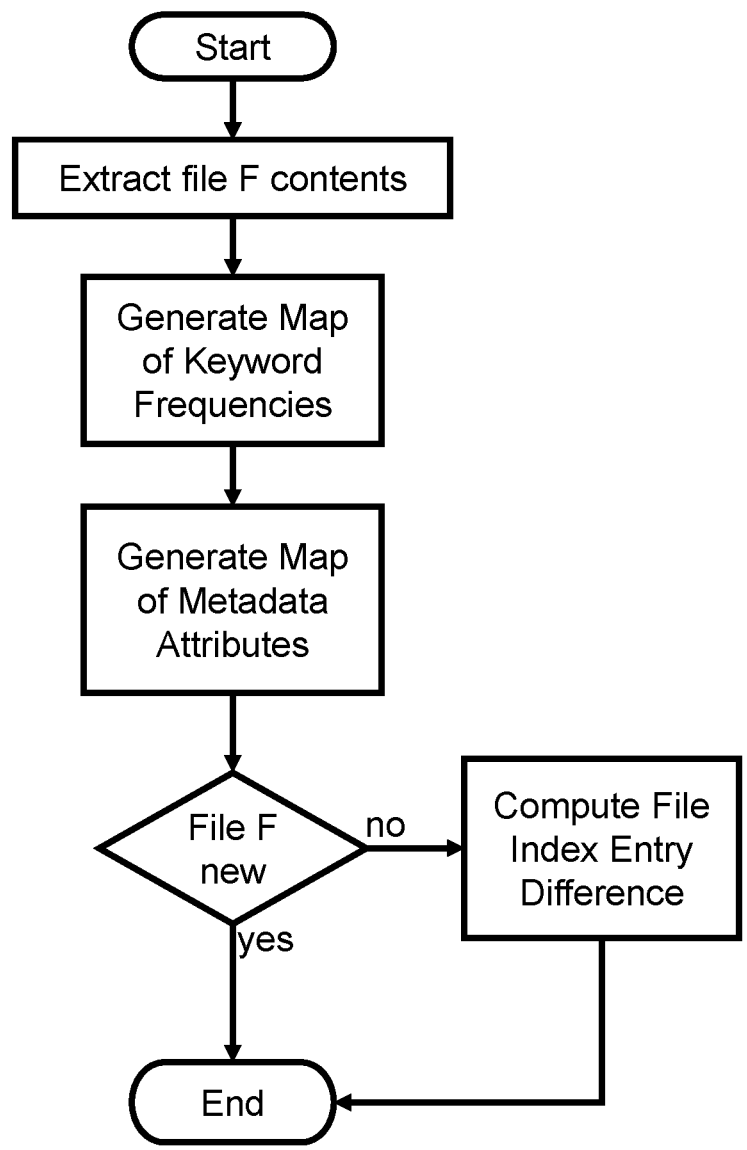
FIG. 3 illustrates the steps through which a file index entry is created on a secure searchable and shareable remote storage system built in accordance with the preferred embodiment of the present invention.

The TM queries CSMDR with F's attributes (file size, modified time, content hash) in order to detect what has changed about the file The TM uses the CSMDR results to decide if it should (1) upload only the modified parts of the file, (2) upload it anew in its entirety, (3) just perform a copy operation on the server (to avoid re-uploading). The decision on which operation to perform is based on the file size, amount of data changed, and number of changes since the last time the file was uploaded in its entirety.
(1) If the TM decides to only upload the changes between the last uploaded version of the file and the current version of the file, then
the TM computes the difference between the last uploaded file and the current version of the file using data from the CSMDR, and uploads the difference to the DS using the APIS
the IDX module computes a file index entry (FIE), e.g., the FIE may include unique keyword terms, their associated frequency, relative location etc.
the IDX computes the difference between the new FIE for file F and the current FIE in the IDX (i.e. keyword frequency changes), called FIED (file index entry difference), and uploads the FIED to the DS using the APIS
(2) If the file is uploaded in its entirety, then
the TM uploads F to the DS using the APIS
the IDX module computes a file index entry (FIE), e.g., the FIE may include unique keyword terms, their associated frequency, relative location etc.
the TM uploads FIE to the DS using the APIS
(3) If the file was moved or copied, then
the TM may upload the data as if it's a new file (above), or ask the APIS to duplicate G and copy it to F in the DS, in order to avoid re-uploading
the IDX module computes a file index entry (FIE), e.g., the FIE may include unique keyword terms, their associated frequency, relative location etc.
Finally, the TM asks the APIS to commit the newer version of the file and update the MDS. If the MDS detects that a newer version of the file F already exists, then an error is thrown, and the APP renames the file and uploads it as a new file.
After successfully saving the file in the MDS and DS, the CSMDR is annotated with information about F (file type, size, content hash, MDS provided version number, etc) and the FIED is handed off to the IDX.
File Delete.
In the case that a file is deleted on a client:
The FSW notifies the TM of the deleted file F
The TM queries the CSMDR for the attributes of F
For files that are folders, the TM collaborates with the FSW to ensure that recursively, all delete events concerning children (e.g., files contained in sub-folders) are processed before any parent (e.g., the sub-folders themselves) delete events. This is achieved partly by appropriately re-ordering the entries in the event queue that the FSW maintains.
Otherwise, the TM notifies the APIS of the version of F that was deleted, and asks the MDS to mark the file F as deleted.
If the file F on the server has a different version number, or has undeleted children (in the case of a folder), then the APIS sends a warning to the APP.
After successfully contacting the APIS, the APP marks for cleanup all data associated with F in the CSMDR and IDX
File Move.
The FSW may not able to detect all file moves on its own. Instead it relies on the TM to detect if a new file (potentially a file moved to a new location) has the same contents as a recently deleted file, for example by computing the hash of the new file, and querying the CSMDR for files with the same hash, in which case the FSW will take the appropriate actions as mentioned in the file create and update procedures.
File Synchronization.
The MDS maintains a per-share monotonically increasing file position counter (FPC), updated on each file operation within the share. File synchronizations by the APP can either retrieve the actual file data contents, or just the index portion corresponding to the file. During file synchronization, the APP performs the following:
For each share, the APP asks the MDS through the APIS, for a list of files changed since the last FPC the APP updated against. This last FPC value is stored in and can be retrieved from the CSMDR.
The APIS returns a list of files ordered by FPC, from oldest to newest modified.
For each file F in the list, the APP queries the MDS through the APIS for the latest version number V. If the version V is different than the version W in the CSMDR for the same file, the APP updates the file as follows:
If the APP is configured to retrieve the file data content, then the APP downloads the file data changes from version V to version W from the DS through the APIS, and applies them to the local file F. After successfully updating F, the IDX computes a new FIE for F, and updates the IDX with FIE.
Otherwise, if the APP is configured to only retrieve indices, then the APP retrieves the index data changes from V to W from the DS through the APIS, and gives the retrieved FIEs and FIEDs to the IDX.
The file attributes for F are updated in the CSMDR.
Finally, the APP updates the FPC in the CSMDR
Indices.
Referring now to FIG. 3, when the IDX computes a file index entry FIE, it extracts index-able content from the file based on the file type. In the preferred embodiment, this is done dynamically and multiple extractors may be added to the system. For example, for a PDF, it will extract all the text and the document title, or for an image it will extract a smaller thumbnail preview, along with other image attributes such as when and where the image was taken.
The FIE consists of two maps:
A map of keyword frequencies, "keywordA: 2, keywordB: 4"
A map of file metadata attributes, i.e., "title: Title, latitude: −82.0, thumbnail: BINARY"
The IDX computes a FIED, by comparing the two FIEs, and producing a difference comprised of:
Keyword frequency difference, e.g., "keywordA: +1, keywordB: −3"
Map metadata differences, e.g., "removed: (latitude), modified: (title: NewTitle))"
The IDX allows queries for boolean and range searches across keywords and attributes, i.e., "keywordA AND keywordB not title=TitleC AND (latitude<23)"
The IDX search results include the list of matching files ranked by their relevance.
Index-Only Download.
The APP allows a user to choose on a per-share and per file basis to retrieve only the FIEs and FIEDs during the file download process, instead of the actual file.
If the user chooses to retrieve only FIEs and FIEDs, then when the user uses the search function in the APP, files indexed but not downloaded will still show up in the search results and the user has the option to later download the actual file.

Remote Server Index.

Although IDX is designed to run client side to avoid the security and privacy issues associated with SED implementations, the client has the option to store a server side index. This allows clients to search through files remotely, at the expense of some privacy. The server IDX (SIDX), stores the index as an encrypted inverted index, mapping encrypted keywords to file IDs, and works as follows.

If the owner of a share S enables SIDX for the share, then during file updates to that share, client APPs perform an additional step of encrypting each keyword individually using SK, and a pre-computed IV based on the keyword. The APPs upload the encrypted keywords along with the updated files to APIS. The APIS adds to the MDS keyword mapping for that share the keyword to file ID entries. If a user has access to S, then using the APP she can search for file IDs matching the given keywords. The user enters the keywords to search for in the APP, the APP encrypts them using SK, and sends the request to APIS. The APIS returns the list of file IDs and their encrypted names for the queried keywords. The APP decrypts the names and displays the search results.

Further, only sub-segments of the index may be stored encrypted in the cloud as inverted lists in which each keyword is associated with a list of documents containing it and optionally the associated positions and/or number of times the keyword appears. These lists are also called "posting lists" traditionally. These encrypted posting lists may be updated during indexing and can be retrieved on-demand by clients during search queries. Clients may also cache posting lists corresponding to popular keywords and the distributed indexing protocol can be used to update the cached posting lists as other clients upload new files or update existing ones etc.

File Encryption and Verification.

File contents and file metadata are encrypted by the APP before they are uploaded to the APIS, and decrypted and verified by the APP when they are retrieved from the APIS.

Each user has a public private key pair (KP). KP is generated by the APP, the first time the user creates her account, and is stored in CSMDR, and optionally encrypted by the APP with a password-derived key, and also stored in MDS Each share has a secret share key (SK), share ID key (SIK), and share version key (SVK), generated by the APP when a user creates a share S, stored in CSMDR, and also stored in MDS, encrypted with the public key KP of the share owner. If other users have access to a share S, then SK, SIK, and SVK will also be encrypted with the public key KP of the other users (refer to Sharing). If some group G has access to share S, then SK, SIK, and SVK with also be encrypted with the secret key GK of group G (refer to Sharing). Each share includes a share key counter, allowing the user to generate new SK, SIK, and SVK keys, re-encrypt the share contents, and broadcast this efficiently to other users (refer to Share Re-Encryption)

Each file update has a secret block key (BK), generated by the APP when a user creates or modifies a file F, and is stored in MDS, encrypted with the share key SK of the share it belongs to. BK is used to encrypt the file data and index contents uploaded to DS Each file update has a cryptographic hash of the contents of the file (HF), and a cryptographic hash of the contents of the index for that file (HI), stored in MDS. The hashes are encrypted using the share key SK of the share the file belongs to, and allow the APP to verify the retrieved file contents. The two hashes are computed separately, so that if the user chooses to only retrieve indices, the APP can still verify their content without retrieving the entire file (refer to as "Index-only Sync")

The aforementioned BK, HF, and HI form the file update's crypto payload (CP), encrypted with the share key SK to which they belong, using a random IV and authenticated encryption, and is stored in MDS.

The file name N of a file F is encrypted by the APP using SK, using a random IV and authenticated encryption, and stored in MDS Each file has a unique file id FID, computed as an HMAC of the path in the share S it belongs to, keyed with the corresponding secret SIK, and stored in MDS. Using a deterministic function to compute FID based on the path and secret key SIK, allows for the APP to compute an FID when querying the APIS for a given file, without revealing the plaintext path of the query, or having to encrypt full paths using predetermined IVs.

Each file update operation (create/update/delete) includes a file version HMAC of the operation parameters, defined and computed as:

An HMAC of the file ID, operation type (share/file/folder create/update/delete), version number, share ID pointer (if the file is a shared folder this value is its share ID, otherwise it is null), crypto payload (CP), and file version HMAC of the previous update, keyed with the SVK for the share in which the file belongs, and stored in MDS.

Since a file version HMAC includes the previous file version's HMAC, the client can verify the file's complete history chain. Since file version HMACs are computed on delete operations as well, when a user creates, deletes, and then creates a file again, the APP will verify the existing file version HMAC entries stored in MDS, and append to them the new file HMAC, extending the existing file version history, without the client having to store all previous HMAC entries locally in the CSMDR.

File contents and index contents are split into equally sized blocks on the client. Each block is compressed, encrypted using a random IV with the corresponding BK for the update, and then uploaded to DS, in that order. Splitting into equally sized blocks allows the client to efficiently resume partial uploads and downloads, while preventing the server from performing attacks based on analyzing compression ratios at varying file offsets. Encrypting file contents with BK, instead of SK, allows for clients to share individual files, by sharing only BK. Encrypting file contents with BK, also allows the APP to efficiently perform some operations, such as file copy, including file copy across shares, without having the client APP re-upload all the data to DS—the APP can simply indicate to MDS and DS to reuse existing data with a file, and encrypt the existing BK in the new CP.

Create Share.

Figure 4:
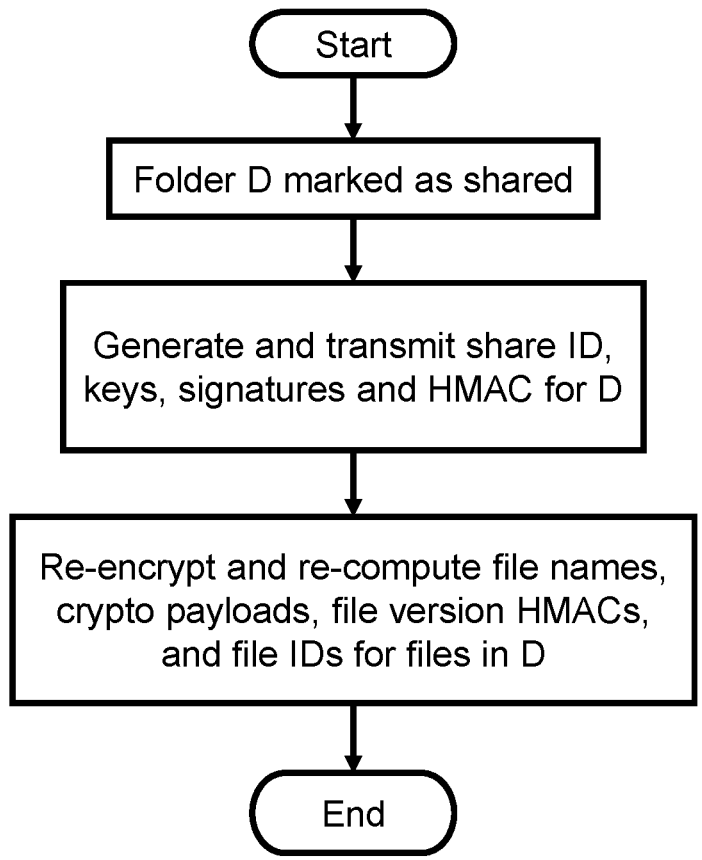
FIG. 4 illustrates the steps through which a file is shared on a secure searchable and shareable remote storage system built in accordance with the preferred embodiment of the present invention.

Referring now to FIG. 4, users can mark folders in their root shares as shared or not shared. After marking a folder as shared, a user becomes its "share owner". Share owners can specify share permissions for other users or groups—for example read or read-write permissions.

To create a share, using the APP, a user A may mark a folder D (with file id FID, in their root share) as "shared", and thus becomes the "owner" of the new share S, corresponding to folder D.

The APP contacts the APIS and stores the information that folder D is shared in the MDS. Along with the request, the client passes to the API and the server stores the following items:
- The new APP generated share ID (SID)
- The new share keys (SK, SIK, SVK), encrypted using user A's public key
- The new share name D encrypted using SK, with a random IV and authenticated encryption
- The share signature (SSIG), which is a signature of: (PREFIX_SHARE, SID, SK, SIK, SVK), signed using A's private key, signing for the existence of S with parameters SID, SK, SIK, and SVK.
- The share create signature (SCS), which is a signature of: (PREFIX_SHARE_CREATE, SID, FID), signed with A's private key, signing for the creation of a share SID at location FID.
- The share member signature (SMEM), which is a signature of: (PREFIX_USER_TO_SHARE, SID, A's user ID, and permissions read and write), signed using A's private key, signing for A's read and write permissions to S.
- The file version HMAC for D, with share pointer value of SID, and operation type "share create".

As part of a successful share create, the APP needs to re-encrypt and re-compute file names, crypto payloads (CP), file version HMACs, and file IDs for all the files in the new share. This is done automatically as a back and forth procedure between the APP and API, re-encrypting many files at a time, as follows:
- The re-encryption worker in the APP asks the APIS for the share signature (SSIG), encrypted share keys, and share create signature (SCS).
- Upon successful verification of the aforementioned signatures, the APP asks the APIS for the list of files in the new share that still need to be re-encrypted
  - The APP verifies that the prefix of all the returned files' paths matches the path of D and computed file id matches FID from the create share step
- For each file, the APP re-encrypts the file name with the new SK, and computes the new file id with the new SIK
- For each file, the APP asks the APIS for the list of file versions to re-encrypt and re-compute using the new SK, SIK, and SVK
- The APP uploads the re-encrypted values to the APIS
- File and index contents do not have to be re-uploaded and re-encrypted, because it suffices to re-encrypt only BK for all files with the new SK
- The re-encryption step is necessary, since every share has unique SK, SIK, and SVK values
- The re-encryption step can be done in parallel by many APPs of the same user For APPs to successfully synchronize after a create share event, it is important that all the files in the sub-tree of D maintain the position ordering, as described in "File position counter properties". To this end, after the re-encryption of all files is finished, the APIS updates the positions of all the files in the sub-tree of D in MDS. Going level by level from the lowest level of D's sub-tree, file entries receive increasing position counters, since the file entries in the root share that were part of the sub-tree of D are now treated as "deleted".

Un-Sharing.

The owner of a share may instruct the APIS to "un-share" a given share S.

To this end, the client APP contacts the APIS and stores the information that folder D corresponding to S becomes a regular folder. Along with the request, the APP passes to the API and the server stores the following additional information:
- An un-share signature (USIG) of: (PREFIX_UN_SHARE, share ID SID of S, and file id FID of D), signed using the owner's private key, signing for the share and location into which it is being turned into a regular folder
- The file version HMAC for D, with share pointer value of SID, and operation type "share unshared"

As part of a successful un-share, the APP needs to re-encrypt and re-compute file names, crypto payloads, file version HMACs, and file IDs of all the files in the old share, so that they are correctly encrypted using the user's root share keys. This is done automatically as a back and forth procedure between the APP and API, re-encrypting many files at a time, as follows:
- The re-encryption worker in the APP asks the APIS for the un-share signature (USIG)
- Upon successful verification of the aforementioned signature, the APP asks for the list of files to re-encrypt, and for each file
  - Re-encrypts the file name with the root SK, and computes the new file id with the root SIK
  - Asks the APIS for the list of file versions to re-encrypt and re-compute using the root SK, SIK, and SVK
  - The APP uploads the re-encrypted values to the APIS
  - In the case that a file already exists at that location in the root share, the APIS sends the APP the most recent file version HMAC from the root share for that location, which the APP verifies, and the APP replies again with the new re-encrypted file version HMACs, this time extending the existing file history
- File and index contents do not have to be re-uploaded and re-encrypted, because it suffices to re-encrypt only BK for all files with the new SK
- The re-encryption step is necessary, since every share has unique SK, SIK, and SVK values
- Once the un-share operation finishes, the unshared files are only available to the owner in their root share
- The re-encryption step can be done in parallel by many APPs of the same user For APPs to successfully synchronize after an un-share event, it is important that all the files in the sub-tree of D maintain the position ordering, as described in "File position counter properties". To this end, after the re-encryption of all files is finished, the APIS updates the positions of all the files in the sub-tree of D in MDS. It increments the position counters of all the files in D's sub-tree by a computed number, so that the order of all the files in the sub-tree of D is preserved, and all the files in the user's root share have a unique position.

Group Encryption and Signatures.

When a user creates a group, or adds or removes users to/from a group, the APP may generate signatures for the new members of the group, and encrypt for them the group key.
- When the user A creates a group G with name N through the APP, the APP:
  - Generates a random group id GID
  - Generates a random symmetric secret key GK
  - Encrypts the group name N with GK using authenticated encryption
  - Creates a group key signature of: (PREFIX_GROUP_KEY, GID, GK), signed with A's private key Sends GID, the encrypted values of N and GK, and the group key signature to the APIS, which stores them in the MDS When the owner of a group adds or removes a user B with user ID BID to or from a group with group id GID and group key GK, the APP does the following Creates a group member signature of: (PREFIX_USER_TO_GROUP, GID, BID, and boolean member flag), signed with A's private key If adding a user, encrypts GK using B's public key Sends the signature and encrypted values to APIS, and the values and permissions are stored in MDS All users who are members of G, can verify that B is also a member by asking MDS for the member signature of B for G Share Encryption and Signatures.

When the owner of a share adds or removes a user or group to/from a share, the APP needs to generate signatures for the new members of the share, and encrypt for them the share keys.

When the owner of a share adds or removes a user B with user ID BID to or from a share S with share ID SID and share keys SK, SIK, and SVK, the APP does the following:

Create a member signature of: (PREFIX_USER_TO_SHARE, BID, SID, and granted permissions (read/write etc.)), signed using the owner's private key If adding a user, encrypt SK, SIK, SVK with B's public key Send the signature and encrypted values to APIS, and the values and permissions are stored in MDS User B can access the share by retrieving the share keys and decrypting them with her key pair. All users who have access to the share can verify that B also has access to the share, by asking MDS for the member signature of B for S.

A similar process occurs when the owner of a share adds or removes a group G with group id GID to or from a share S with share ID SID and share keys SK, SIK, SVK. The APP does the following:

Create a member signature of: (PREFIX_GROUP_TO_SHARE, GID, SID, and granted permissions (read/write etc.)), signed using the owner's private key If adding a group, encrypt SK, SIK, SVK with G's secret group key using authenticated encryption Send the signature and encrypted values to APIS, and the values and permissions are stored in MDS Members of group G can access the share by decrypting the share keys with G's secret group key. All users who have access to the share can verify that G also has access to the share, by asking MDS for the member signature of G for S.

Re-Encrypting Shares.

When a share or group owner removes a user or group from a share, or a user from a group, a malicious server could still grant access to future modifications to a removed user or group. To defeat that, the owner of a share S can issue a command to re-encrypt the share, such that any new information in the share is encrypted using new keys, which removed members do not have access to, as follows:

The owner uses the APP to issue a "share re-encrypt" procedure on share S through the APIS and MDS.

The APP generates new SK, SIK, and SVK for S, and encrypts them with all users' public keys that currently have access to the share, as well as all groups' secret keys that have access to the share.

The APP generates a new share signature (SSIG), which is a signature of: (PREFIX_SHARE, share key version number, and new keys SID, SK, SIK, and SVK, as well as old keys SK_OLD, SIK_OLD, SVK_OLD), signed using A's private key, signing for the existence of S with parameters SID, SK, SIK, and SVK.

The APP sends these newly encrypted values and signatures to the APIS, which stores them in the MDS and increments the share's key version number.

As part of a successful share re-encrypt, the APP needs to re-encrypt and re-compute file names, crypto payloads, file version HMACs, and file IDs of all the files in the share, so that they are correctly encrypted using the new share keys. This is done automatically as a back and forth procedure between the APP and API, re-encrypting many files at a time, as follows:

The re-encryption worker in the APP asks the APIS for the new share signature (SSIG), and keys, decrypting and verifying them Upon successful verification of the SSIG, the APP asks for the list of files to re-encrypt, and for each file Re-encrypts the file name with the new SK, and computes the new file id with the new SIK Asks the APIS for the list of file versions to re-encrypt and re-compute using the new SK, SIK, and SVK The APP uploads the re-encrypted values to the APIS File and index contents are not re-uploaded and re-encrypted, since any user or group, which had access to the share before would still know as much as they did before re-encryption.

As noted in "File encryption and verification", each file update includes the share key version counter, which the server checks against the share key version counter in MDS.

If the share key version counter is different, the server raises an error, indicating to the APP it needs to retrieve the latest share keys. Then, if the client no longer has access to the share, they will not be able to retrieve the latest keys If the server fails to correctly inform all client APPs that the share key version counter and keys have changed, then different APPs will upload changes which will fail verification on the APPs which have the latest keys Trusted User List.

In order for two users (Alice and Bob), to securely share files, Alice and Bob need to have each other's public keys. Alice and Bob obtain each other's keys securely through an authenticated channel before storing them in their trusted users list.

To add Bob to her trusted users list, Alice provide Bob's username to the client APP The APP connects to the MDS, passing in Bob's username, and retrieves Bob's public key, user ID, and UCS The APP uses the retrieved Bob's public key to verify Bob's signature on the UCS, implicitly confirming Bob's username and user ID.

For security, the APP prompts Alice to check Bob's public key fingerprint received from the server against the actual public key fingerprint, as may have been specified by Bob through a channel considered authenticated by Alice, e.g., username, text, voice, smartphone near field communication, Bluetooth, QR code etc.

If Alice accepts Bob's public key fingerprint, then the APP creates a signature of: (PREFIX_PUB-LIC_KEY, Bob's user ID, Bob's username, Bob's public key, and boolean flag trusted), signed with Alice's private key The APP then sends this signature to the MDS, where it is stored for future retrieval Finally, the APP saves Bob's username, public key, and user ID to its CSMDR To remove Bob from her trusted user list, Alice provides Bob's username to the client APP The APP retrieves from CSMDR Bob's username, user ID, public key.

The APP creates a signature of: (PREFIX_PUB-LIC_KEY, Bob's user ID, Bob's username, Bob's public key, and boolean flag untrusted), signed with Alice's private key The APP then sends the signature to the MDS, where it is stored for future retrieval Finally, the APP updates the CSMDR entry for Bob's public key, marking it as untrusted Retrieving List of Trusted Users.

Any of Alice's APPs can retrieve the list of trusted and untrusted users from the MDS using the APIS.

For validation, the APP can then verify Alice's signature on the list of trusted users, their usernames, public keys, and user IDs.

"Circle of Trust" Certificates.

An organization O may decide to have a key pair and use the private key to generate signed certificates for the public keys of its members. Users trusting the public key of O can automatically verify the signed public key certificates of O's members and may decide to add any of them to the trusted user list without having to perform a direct interaction, or public key fingerprint comparison as above etc.

Trusting users vetted by a "circle of trust".

A user A may add organization O's public key as a trusted "organization" or "circle of trust" through the APP, specifying that this is an organization key, valid for a collection of members, whose usernames match a defined pattern, e.g., "firstname.lastname@company.com".

Also, within an organization, all computers and APPs may come preinstalled with the organization's public key as a trusted circle of trust.

Alternately, upon employment onboarding, new employees are being provided with their department's or their organization's circle of trust keys. Note that a user can be part of more than one circle of trust.

Later, when user A asks the server for user B's public key, and (optionally) user B's username matches a trusted a pattern of an organization O's public key, and the server responds with a signature by O for B, then A may use O's public key to verify the server-provided signature for B's public key, and if verified, adds B's public key to its list of trusted users.

Further, a given user B may have their public key signed by multiple circles of trust.

Secure Clouds.

If the cloud provides private secure computation units that protect their data and computation from the cloud provider and other malicious entities, any and all server-side and some of the client-side components can be outsourced and run in the cloud securely for increased security, efficiency and availability. For example, the APIS works together with a number of other server-side components to provide access control for clients—as a result it can monitor the existence and intensity of inter-client and inter-user interactions such as sharing. If secure computation units are available, it may be desirable to eliminate this leak entirely by running the corresponding components inside secure computation units with full privacy etc.

Search Folders.

The APP allows users to establish virtual folders corresponding to given search queries. For example, the user may establish a folder "meningitis patients" corresponding e.g., to the search results of the query "meningitis" inside the "patients" share folder. As the search results change (i.e., and new patients are added or removed), the folder content is dynamically updated by the APP.

Additional Trust Establishment and Authentication Channels.

To authenticate public keys of other users, the APP allows a user to provide a fingerprint of the public keys—received over a channels the users trust, such as email—which will be used to validate the received keys. Users may also use other channels to exchange either the fingerprints or the public keys themselves, including near field communication or other inter-smartphone communication channel, visual channels (e.g., one smartphone taking a picture of another smartphone's displayed QR code), mechanical channels (e.g., two smartphones being moved together, using the common movement as a cryptographic key to provide a secure communication channel).

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An encrypted cloud storage system with search, comprising:

at least one remote computer server having a processor and a non-volatile memory, wherein said at least one remote computer server is operatively connected to a computer network so as to communicate electronic files as electrical signals and is adapted to store electronic files;

an alpha local computer having a processor and a non-volatile memory, wherein said alpha local computer is adapted to communicate electronic files with said at least one remote computer server as electrical signals over said computer network;

an alpha indexer module integral with said alpha local computer, wherein said indexer module is arranged to adapt the processor of the alpha local computer to compute an X file index entry prior to being encrypted, wherein the X file index entry which corresponds to plaintext data of an X data file present on said alpha local computer;

an alpha synchronizer module integral with the alpha local computer, wherein said alpha synchronizer module is arranged to adapt the processor of the alpha local computer to encrypt the X file index entry; and wherein said alpha synchronizer module is additionally arranged to adapt the processor of the alpha local computer to transmit the X file index entry to the at least one remote computer server for storage once encrypted;

a beta local computer having a processor and a non-volatile memory, wherein said beta local computer is adapted to communicate electronic files with said at least one remote computer server as electrical signals over said computer network;

a beta synchronizer module integral with the beta local computer, wherein said beta synchronizer module is arranged to adapt the processor of the beta local computer to access and selectively decrypt the at least one of the X file index entry stored on the at least one remote computer server; and a beta searcher module integral with said beta local computer, wherein said beta searcher module is arranged to adapt the processor of the beta local computer to search plaintext data in said decrypted X file index entry.

2. The encrypted cloud storage system with search of claim 1, wherein:

said alpha synchronizer module is further arranged to adapt the processor of the alpha local computer to encrypt the X data file;

said alpha synchronizer module is further arranged to adapt the processor of the alpha local computer to transmit the X data file to the remote computer server for storage once encrypted;

said beta synchronizer module is further arranged to adapt the processor of the beta local computer to access and selectively decrypt the X data file stored on the remote computer server; and said beta searcher module is further arranged to adapt the processor of the beta local computer to search plaintext data in said decrypted X data file.

3. The encrypted cloud storage system with search of claim 2, additionally comprising at least one alpha searcher module integral with said alpha local computer, wherein said at least one alpha searcher module is arranged to adapt the processor of the alpha local computer to search plaintext data in the X file index entry present on said alpha local computer.

4. The encrypted cloud storage system with search of claim 3, wherein:

said beta synchronizer module is additionally arranged to adapt the processor of the beta local computer to encrypt at least one of a Y data file and a Y file index entry, wherein the Y file index entry corresponds to plaintext data of the Y data file present on said beta local computer; and said beta synchronizer module is additionally arranged to adapt the processor of the beta local computer to transmit the at least one of the Y data file and Y file index entry to the at least one remote computer server for storage once encrypted.

5. The encrypted cloud storage system with search of claim 4, additionally comprising a beta indexer module integral with said beta local computer, wherein said beta indexer module is arranged to adapt the processor of the beta local computer to at least one of compute the Y file index entry prior to being encrypted and compute the X file index entry from the decrypted X data file.

6. The encrypted cloud storage system with search of claim 4, additionally comprising a share module integral with the alpha local computer, wherein said alpha share module is arranged to adapt the processor of the alpha local computer to identify at least one share designee to the at least one remote computer server and to cause the at least one remote computer server to permit the at least one share designee to access at least one of the encrypted X data file and encrypted X file index entry stored on the at least one remote computer server.

7. The encrypted cloud storage system with search of claim 1, additionally comprising at least one alpha searcher module integral with said alpha local computer, wherein said at least one alpha searcher module is arranged to adapt the processor of the alpha local computer to search plaintext data in the X file index entry present on said alpha local computer.

8. The encrypted cloud storage system with search of claim 7, wherein:

said beta synchronizer module is additionally arranged to adapt the processor of the beta local computer to encrypt at least one of a Y data file and a Y file index entry, wherein the Y file index entry corresponds to plaintext data of the Y data file present on said beta local computer; and said beta synchronizer module is additionally arranged to adapt the processor of the beta local computer to transmit the at least one of the Y data file and Y file index entry to the at least one remote computer server for storage once encrypted.

9. The encrypted cloud storage system with search of claim 8, additionally comprising a beta indexer module integral with said beta local computer, wherein said beta indexer module is arranged to adapt the processor of the beta local computer to at least one of compute the Y file index entry prior to being encrypted and compute the X file index entry from the decrypted X data file.

10. The encrypted cloud storage system with search of claim 8, additionally comprising a share module integral with the alpha local computer, wherein said alpha share module is arranged to adapt the processor of the alpha local computer to identify at least one share designee to the at least one remote computer server and to cause the at least one remote computer server to permit the at least one share designee to access at least one of the encrypted X data file and encrypted X file index entry stored on the at least one remote computer server.

11. The encrypted cloud storage system with search of claim 1, wherein:

said beta synchronizer module is additionally arranged to adapt the processor of the beta local computer to encrypt at least one of a Y data file and a Y file index entry, wherein the Y file index entry corresponds to plaintext data of the Y data file present on said beta local computer; and said beta synchronizer module is additionally arranged to adapt the processor of the beta local computer to transmit the at least one of the Y data file and Y file index entry to the at least one remote computer server for storage once encrypted.

12. The encrypted cloud storage system with search of claim 11, additionally comprising a beta indexer module integral with said beta local computer, wherein said beta indexer module is arranged to adapt the processor of the beta local computer to at least one of compute the Y file index entry prior to being encrypted and compute the X file index entry from the decrypted X data file.

13. The encrypted cloud storage system with search of claim 1, additionally comprising a share module integral with the alpha local computer, wherein said alpha share module is arranged to adapt the processor of the alpha local computer to identify at least one share designee to the at least one remote computer server and to cause the at least one remote computer server to permit the at least one share designee to access at least one of the encrypted X data file and encrypted X file index entry stored on the at least one remote computer server.

14. The encrypted cloud storage system with search of claim 13, wherein upon the identification of the beta local computer as the share designee, said alpha share module is arranged to adapt the processor of the alpha local computer to assign at least a share key and a share key counter to the X data file and X file index entry.

15. The encrypted cloud storage system with search of claim 14, wherein said alpha synchronizer module is further arranged to adapt the processor of the alpha local computer to encrypt the X data file and the X file index entry by splitting the X data file and the X file index entry in data blocks and encrypting each data block separately wherein said data blocks are encrypted using a secret block key which is encrypted using authenticated encryption with random initialization vectors, using the share key related to the data block.

16. The encrypted cloud storage system with search of claim 15, wherein upon the identification of the beta local computer as the share designee, said alpha share module is further arranged to adapt the processor of the alpha local computer to update at least one monotonically increasing position counter on each file operation within the share.

17. The encrypted cloud storage system with search of claim 16, wherein upon the identification of the beta local computer as the share designee, said beta synchronizer module is arranged to adapt the processor of the beta local computer to selectively download the X file index entry based on a value of the at least one monotonically increasing position counter.

18. The encrypted cloud storage system with search of claim 15, wherein upon the identification of the beta local computer as the share designee, said beta synchronizer module is arranged to adapt the processor of the beta local computer to selectively download the X file index entry based on a value of the at least one monotonically increasing position counter.

19. The encrypted cloud storage system with search of claim 14, wherein upon the identification of the beta local computer as the share designee, said beta synchronizer module is arranged to adapt the processor of the beta local computer to selectively download the X file index entry based on a value of the at least one monotonically increasing position counter.

20. The encrypted cloud storage system with search of claim 2, wherein:
said beta synchronizer module is additionally arranged to adapt the processor of the beta local computer to encrypt at least one of a Y data file and a Y file index entry, wherein the Y file index entry corresponds to plaintext data of the Y data file present on said beta local computer; and
said beta synchronizer module is additionally arranged to adapt the processor of the beta local computer to transmit the at least one of the Y data file and Y file index entry to the at least one remote computer server for storage once encrypted.

21. The encrypted cloud storage system with search of claim 20, additionally comprising a beta indexer module integral with said beta local computer, wherein said beta indexer module is arranged to adapt the processor of the beta local computer to at least one of compute the Y file index entry prior to being encrypted and compute the X file index entry from the decrypted X data file.

22. The encrypted cloud storage system with search of claim 20, additionally comprising a share module integral with the alpha local computer, wherein said alpha share module is arranged to adapt the processor of the alpha local computer to identify at least one share designee to the at least one remote computer server and to cause the at least one remote computer server to permit the at least one share designee to access at least one of the encrypted X data file and encrypted X file index entry stored on the at least one remote computer server.

23. A method for managing electronic data through a cloud storage system, comprising the steps of:
providing at least one remote computer server having a processor and a nonvolatile memory, wherein that said at least one remote computer server is operatively connected to a computer network so as to communicate electronic files as electrical signals and adapted to store electronic files;
providing an alpha local computer and a beta local computer, wherein said alpha local computer and beta local computer each have a processor and a nonvolatile memory and each are adapted to communicate electronic files with said at least one remote computer server as electrical signals over said computer network;
providing an alpha indexer module integral with the alpha local computer, wherein said alpha indexer module is operative to adapt the processor of the alpha local computer to compute an X file index entry, wherein the X file index entry corresponds to plaintext data of an X data file present on said alpha local computer;
providing an alpha synchronizer module integral with the alpha local computer, wherein said alpha synchronizer module is operative to adapt the processor of the alpha local computer to encrypt the X file index entry;
wherein said alpha synchronizer module is further operative to adapt the processor of the alpha local computer to transmit the X file index entry to the at least one remote computer server for storage once encrypted;
providing a beta synchronizer module integral with the beta local computer, wherein said beta synchronizer module is operative to adapt the processor of the beta local computer to access and selectively decrypt the X file index entry stored on the remote computer server; and
providing a beta searcher module integral with said beta local computer, wherein said beta searcher module is operative to adapt the processor of the beta local computer to search plaintext data in said decrypted X file index entry.

24. The method of claim 23, wherein said at least one remote computer server adapted to store, access, and distribute electronic data to a plurality of discrete local clients over said computer network, with said electronic data defining at least one of structured data file and file events and said method, additionally comprising the steps of:
associating by said at least one remote computer server at least one position counter having a value that corresponds to a modification type relating a classification of activity in the electronic data stored on the remote computer server; and
upon an occurrence of activity in the electronic data stored on the remote computer server, incrementing the value of the at least one position counter which corresponds to the modification type under which the occurred activity is classified, thereby enabling each of the plurality of discrete local clients to query activity on the remote computer server based on the classification and sequence thereof through the value of the at least one position counter.

25. The method of claim 24, wherein the step of associating includes associating by said at least one remote computer server a plurality of discrete position counters which each have a value that corresponds to a discrete modification type relating to a classification of activity in the electronic data stored on the remote computer server.

26. The method of claim 24, additionally comprising the step of retrieving by at least one said plurality of discrete local clients at least one of said structured data file and file event stored on the at least one remote computer server, wherein the step of retrieving includes confirming the value of the at least one position counter.

27. The method of claim 24, wherein the at least one position counter includes at least one of a per share file position counter, a per share delete position counter, a per share user position counter, a per share group position counter, per user user share position counter, a per user user group position counter, a per group group member position counter, a per group group share position counter, and a per user user key position counter.

28. The method of claim 24, comprising the step of associating a data modification event with at least one encrypted and authenticated message which has been propagated to the plurality of discrete local clients so as to enable each of said plurality of discrete local clients to decrypt the at least one encrypted and authenticated message and verify authenticity of the decrypted at least one encrypted and authenticated message.

29. The method of claim 28, wherein said data modification event defines a share creation event through which a first client of said plurality of discrete local clients marks an electronic file as accessible by other clients of said at least one shared clients.

30. The method of claim 29, wherein said at least one encrypted and authenticated message includes a share ID, share keys encrypted using a public key of the first client, the share name encrypted with a random IV and authenticated encryption, a share signature signed using a private key of the first client, a share create signature signed with the private key of the first client, the share member signature signed using the private key of the first client, and a file version HMAC including a share creation operation type.

31. The method of claim 29, additionally comprising the steps of:
initiating by said first client the share creation event; and
re-encrypting and re-computing at least one of file names, crypto payloads, file version hash message authentication codes, and file identifiers for the marked electronic file.

32. The method of claim 23, comprising the step of associating a data modification event with at least one encrypted and authenticated message which has been propagated to the plurality of discrete local clients so as to enable each of said plurality of discrete local clients to decrypt the at least one encrypted and authenticated message and verify authenticity of the decrypted at least one encrypted and authenticated message.

33. A method for managing a remote storage system for encrypted data files so that the data files are searchable and shareable, comprising the steps of:
providing at least one remote computer server operative to receive and selectively avail electronic data over a computer network electronic data;
associating an alpha local computer adapted to communicate electronic data over said computer network with a first user account on said at least one remote computer server and a beta local computer adapted to communicate electronic data over said computer network with the first user account on said at least one remote computer server;
identifying on the alpha local computer a first data file having plaintext data;
computing a first file index entry corresponding to the plaintext data of the first data file;
uploading by said alpha local computer the first file index entry to at least one remote computer server, wherein the first file index entry is encrypted before being uploaded to the at least one remote computer server
downloading and decrypting by said beta local computer the at least one of the X file index entry stored on the at least one remote computer server; and
searching by said beta local computer plaintext data in said decrypted X file index entry.

34. The method of claim 33, additionally comprising the steps of:
uploading by said alpha local computer the first data file to the at least one remote computer server, wherein said first data file is encrypted before being uploaded to the at least one remote computer server;
downloading and decrypting by said beta local computer the first data file from at least one remote computer server; and
searching by said beta local computer plaintext data in said decrypted first data file.

35. The method of claim 34, additionally comprising the step of transmitting by said alpha local computer a counter value relating to the first data file, wherein the step of transmitting by said alpha local computer is performed prior to performing the step of downloading and decrypting by said beta local computer the first data file from at least one remote computer server.

36. The method of claim 35, additionally comprising the step of retrieving by said beta local computer the counter value relating to the first data file, wherein the step of transmitting by said beta local computer is performed prior to performing the step of downloading and decrypting by said beta local computer the first data file from at least one remote computer server.

37. The method of claim 34, additionally comprising the step of transmitting by said beta local computer a verification communication relating to the first data file to said alpha local computer, thereby enabling the alpha local computer to verify that the first data file on the beta local computer has the same contents as the first data file on the alpha local computer.

38. The method of claim 34, additionally comprising the step of transmitting by said alpha local computer a verification communication relating to the first data file to said beta local computer, thereby enabling the beta local computer to verify that the first data file on the alpha local computer has the same contents as the first data file on the beta local computer.

39. The method of claim 33, additionally comprising the steps of:
associating a gamma local computer adapted to communicate electronic data over said computer network with a third user account on said at least one remote computer server;
designating the first data file as shared with the third user account, thereby causing said at least one remote computer server to avail the first data file and the file index entry for the first data file to the gamma local computer; and downloading and decrypting by said gamma local computer at least one of the first data file and the file index entry for the first data file from at least one remote computer server, thereby allowing the plaintext data of the first data file to be directly accessed by said gamma local computer.

40. The method of claim 39, additionally comprising the step of transmitting by said gamma local computer a counter value relating to the first data file, wherein the step of transmitting by said gamma local computer is performed prior to performing the step of downloading and decrypting by said gamma local computer at least one of the first data file and the file index entry for the first data file from at least one remote computer server.

41. The method of claim 39, additionally comprising the step of transmitting by said gamma local computer a verification communication relating to the first data file to said alpha local computer, thereby enabling the alpha local computer to verify that the first data file on the gamma local computer has the same contents as the first data file on the alpha local computer.

42. The method of claim 39, additionally comprising the step of transmitting by said alpha local computer a verification communication relating to the first data file to said gamma local computer, thereby enabling the gamma local computer to verify that the first data file on the alpha local computer has the same contents as the first data file on the gamma local computer.

* * * * *